US012792026B2

(12) United States Patent
Ikeda et al.

(10) Patent No.: US 12,792,026 B2
(45) Date of Patent: Nov. 10, 2026

(54) SYSTEM, METHOD OF MANUFACTURING VEHICLE, SERVER, VEHICLE, AND POWER FEEDER

(71) Applicant: TOYOTA JIDOSHA KABUSHIKI KAISHA, Toyota (JP)

(72) Inventors: Keigo Ikeda, Nisshin (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 409 days.

(21) Appl. No.: 18/425,037

(22) Filed: Jan. 29, 2024

(65) Prior Publication Data

US 2024/0264587 A1 Aug. 8, 2024

(30) Foreign Application Priority Data

Feb. 8, 2023 (JP) ................................ 2023-017686
Sep. 25, 2023 (JP) ................................ 2023-160606

(51) Int. Cl.
*G05B 19/418* (2006.01)
*B60L 53/12* (2019.01)
(Continued)

(52) U.S. Cl.
CPC ........ *G05B 19/41875* (2013.01); *B60L 53/12* (2019.02); *B60L 58/13* (2019.02);
(Continued)

(58) Field of Classification Search
CPC ............. B60L 2240/62; B60L 2240/70; B60L 2240/80; B60L 2260/32; B60L 2260/52;
(Continued)

(56) References Cited

U.S. PATENT DOCUMENTS

2008/0266051 A1* 10/2008 Taki ...................... G07C 5/008 340/5.1
2010/0201306 A1* 8/2010 Kazama .................... G06F 1/26 320/137
(Continued)

FOREIGN PATENT DOCUMENTS

JP 2017-538619 A 12/2017
JP 2021-100309 A 7/2021
(Continued)

*Primary Examiner* — Kidest Worku
(74) *Attorney, Agent, or Firm* — Oblon, McClelland, Maier & Neustadt, L.L.P.

(57) ABSTRACT

A system used in a factory for manufacture of a vehicle comprises: a remote controller remotely controlling running of the vehicle capable of running in the factory during a course of manufacture in the factory, the vehicle including a communication device having a communication function for remote control and a secondary battery for running; a power feeder available for charging the secondary battery; a manufacturing status acquisition unit acquiring information about a manufacturing status in the factory; and a feeding judgment unit judging whether to feed the vehicle using the acquired information about the manufacturing status. When the feeding judgment unit judges that the vehicle is to be fed, the vehicle is fed using the power feeder.

10 Claims, 14 Drawing Sheets

(51) Int. Cl.

| | |
|---|---|
| ***B60L 58/13*** | (2019.01) |
| ***G05B 19/406*** | (2006.01) |
| ***G05D 1/221*** | (2024.01) |
| ***G05D 1/644*** | (2024.01) |
| *G05D 107/70* | (2024.01) |
| *G05D 109/10* | (2024.01) |

(52) U.S. Cl.
CPC ........... *G05B 19/406* (2013.01); *G05D 1/221* (2024.01); *G05D 1/644* (2024.01); *G05B 2219/31004* (2013.01); *G05B 2219/31457* (2013.01); *G05D 2107/70* (2024.01); *G05D 2109/10* (2024.01)

(58) Field of Classification Search
CPC ........ B60L 53/12; B60L 53/305; B60L 53/32; B60L 53/66; B60L 58/12; B60L 58/13; B60L 55/00; B60L 9/00; G05B 19/406; G05B 19/41805; G05B 19/41875; G05B 19/41895; G05B 2219/2637; G05B 2219/31004; G05B 2219/31054; G05B 2219/31457; G05B 2219/45055; G05B 11/00; G05B 2219/00; G05D 1/221; G05D 1/644; G05D 2107/70; G05D 2109/10; G05D 2107/00; G05D 2105/00
See application file for complete search history.

(56) References Cited

U.S. PATENT DOCUMENTS

| | | | | |
|---|---|---|---|---|
| 2015/0263541 | A1* | 9/2015 | Fukui | B60L 3/0046 320/134 |
| 2016/0048130 | A1* | 2/2016 | Vavrick | G05D 1/0217 180/168 |
| 2017/0320529 | A1 | 11/2017 | Nordbruch | |
| 2020/0140028 | A1 | 5/2020 | Wells et al. | |
| 2020/0269712 | A1* | 8/2020 | Kozlovsky | B60L 53/12 |
| 2024/0160226 | A1* | 5/2024 | Bell | G05B 19/41895 |

FOREIGN PATENT DOCUMENTS

| | | | | | |
|---|---|---|---|---|---|
| KR | 20170040923 | A | * | 4/2017 | B60L 11/1814 |
| KR | 102208222 | B1 | * | 1/2021 | G01R 31/36 |

* cited by examiner

FC
500b
PRE-STEP
50
POST-STEP
60
SERVER
300
70
72
80
80
100b
150b
152b
154
156
158
120
130
140
170
180
190
COMMUNICATION UNIT
ECU
BATTERY
RECEIVING CIRCUIT
RECEIVING RESONANT CIRCUIT
PCU
MOTOR
MISALIGNMENT DETECTOR
RT
252
256
258
259
FEEDING RESONANT CIRCUIT
FEEDING CIRCUIT
254
POWER SOURCE CIRCUIT
240
200b
CPU
FEEDING CONTROLLER
212
210
MEMORY
220
COMMUNICATION UNIT
290
280

SYSTEM, METHOD OF MANUFACTURING VEHICLE, SERVER, VEHICLE, AND POWER FEEDER

CROSS-REFERENCE TO RELATED APPLICATIONS

The present application claims priority from Japanese patent application P2023-017686 filed on Feb. 8, 2023 and Japanese patent application P2023-160606 filed on Sep. 25, 2023, the disclosures of which are hereby incorporated in their entirety by reference into the present application.

BACKGROUND

Field

The present disclosure relates to a system, a method of manufacturing a vehicle, a server, a vehicle, and a power feeder.

Related Art

For example, for efficiently operating a manufacturing system for vehicle production, Japanese Patent Application Publication (Translation of PCT Application) No. 2017-538619 discloses a vehicle running method of causing a vehicle to run from an end of an assembly line of the manufacturing system to a parking area of the manufacturing system by remote control, etc.

In a manufacturing factory where a vehicle is manufactured, for example, remote control over the vehicle may be implemented for a longer period than a scheduled period due to reason such as delay in the manufacture. In this case, power in a secondary battery for running installed on the vehicle is consumed more than schedule, causing a risk that a state of charge (SOC) of the secondary battery will become lower than a target value or a management value.

SUMMARY

The present disclosure is feasible in the following aspects.

According to one aspect of the present disclosure, a system used in a factory for manufacture of a vehicle is provided. The system comprises: a remote controller remotely controlling running of the vehicle capable of running in the factory during a course of manufacture in the factory, the vehicle including a communication device having a communication function for remote control and a secondary battery for running; a power feeder available for charging the secondary battery; a manufacturing status acquisition unit acquiring information about a manufacturing status in the factory; and a feeding judgment unit judging whether to feed the vehicle using the acquired information about the manufacturing status. When the feeding judgment unit judges that the vehicle is to be fed, the vehicle is fed using the power feeder.

DETAILED DESCRIPTION

A. First Embodiment

Figure 1:
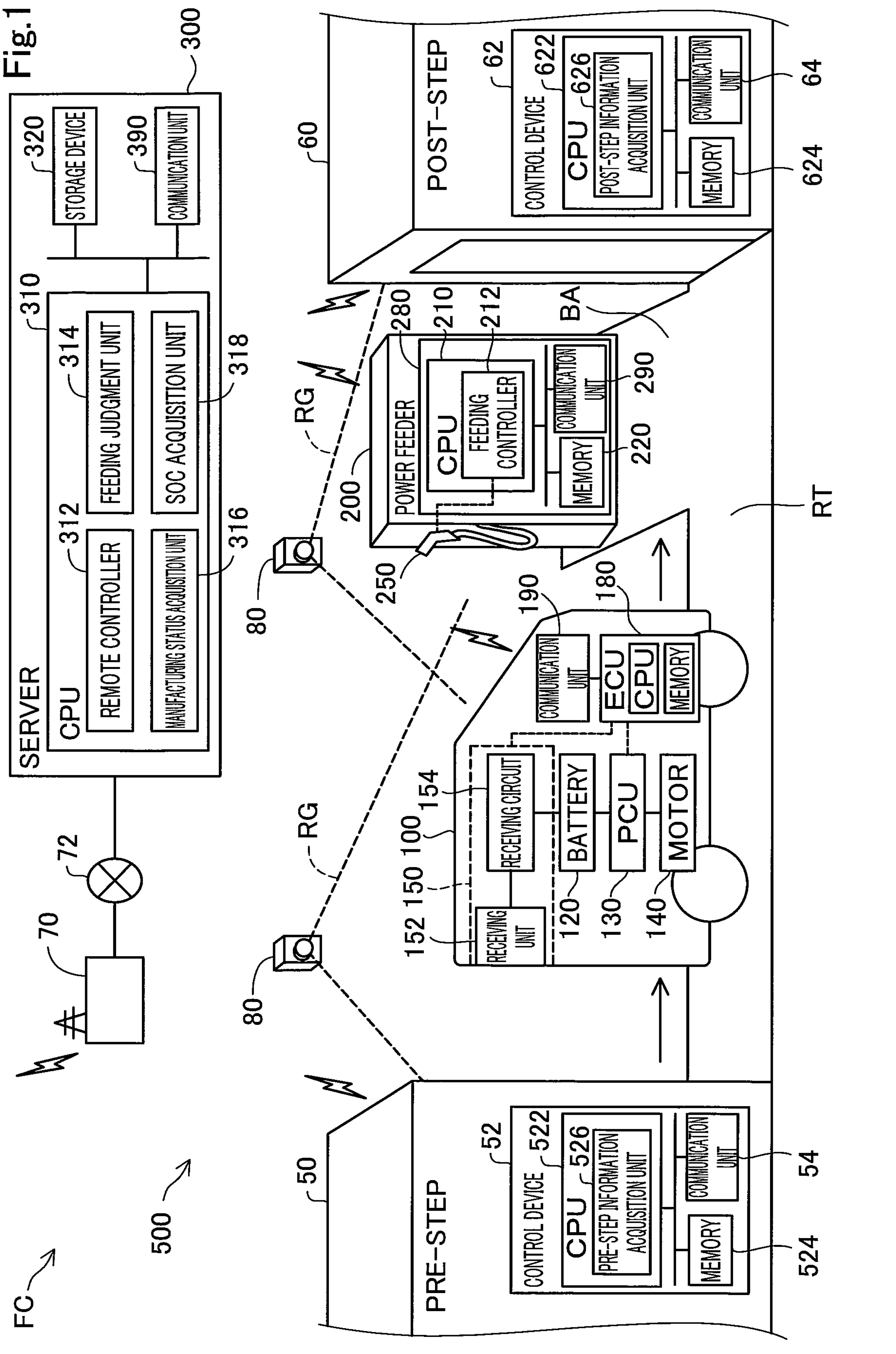
FIG. 1 is an explanatory view showing a schematic configuration of a system according to a first embodiment.

FIG. 1 is an explanatory view showing a schematic configuration of a system 500 according to a first embodiment. The system 500 is used in a factory FC for manufacture of a vehicle 100. The system 500 remotely controls automatic driving of the vehicle 100 to run in the factory FC during a course of manufacture of the vehicle 100. The factory FC is not limited to one building, to a case in which the factory FC is located at one site or one address, etc., but steps in the factory FC during the course of manufacture may extend across a plurality of buildings, a plurality of sites, or a plurality of addresses, for example. "Running of the vehicle 100 in the factory FC" includes a case in which the vehicle 100 runs between steps located at a plurality of places and includes a case in which the vehicle 100 runs not only on a private road but also on a public road between factories located at a plurality of places for moving between these factories, for example. In the present specification, a vehicle finished as a product, and a vehicle as a semifinished product and a vehicle as an in-process item during manufacture are also collectively called the "vehicle 100."

The system 500 includes a power feeder 200 and a server 300. The power feeder 200 supplies the vehicle 100 with power from an external power source such as a system power source. The power feeder 200 includes a feeding connector 250, a feeding control device 280, and a communication unit 290. In the present embodiment, feeding of the vehicle 100 from the power feeder 200 is implemented by manual operation by an operator such as connecting the feeding connector 250 to the vehicle 100, for example. The communication unit 290 is a radio communication device for radio communication with external devices such as the vehicle 100 and the server 300.

The feeding control device 280 is configured using a computer including a CPU 210 as a central processing unit, and a memory 220 such as a RAM or a ROM. The CPU 210 executes a program stored in the memory 220 to realize some or all of functions such as a feeding controller 212. The CPU 210, the memory 220, and the communication unit 290 are connected to each other via an internal bus or an interface circuit.

In the present embodiment, the feeding controller 212 acquires information from the vehicle 100 via the communication unit 290, the information being a state of charge (SOC) of a battery 120 installed on the vehicle 100, and others. During feeding of the battery 120, the feeding controller 212 makes adjustment in such a manner as to make a feeding condition such as supply power or a feeding period suitable for the battery 120 using the acquired SOC, and others.

The server 300 includes a CPU 310 as a central processing unit, a storage device 320, and a communication unit 390. These units are connected to each other via an internal bus or an interface circuit, for example. The communication unit 390 is a circuit for communication with the vehicle 100, the power feeder 200, a pre-step management device 52, a post-step management device 62, and others via a network 72.

The storage device 320 is a RAM, a ROM, or a hard disk drive (HDD), for example. The HDD or the ROM stores various programs for realizing functions provided in the present embodiment. The CPU 310 executes a computer program stored in the storage device 320. This causes the CPU 310 to function as a remote controller 312, a feeding judgment unit 314, a manufacturing status acquisition unit 316, an SOC acquisition unit 318, and others. The SOC acquisition unit 318 functions as a state of charge acquisition unit that acquires an SOC of the battery 120 from the vehicle 100. The SOC is calculable using a cell voltage, a current, or a temperature at the battery 120 detected by a sensor not shown in the drawings, for example. The SOC may be estimated from a period elapsed from previous measurement, or a running period or a running distance of the vehicle 100, for example.

The manufacturing status acquisition unit 316 acquires a manufacturing status in each step in the factory FC. The "manufacturing status" includes start timing and finish timing of a process, identification information or vehicle type of a product, the number of in-process items in a step, a scheduled manufacture volume per day, a target manufacturing period in a step for manufacturing one vehicle 100, and a delay status with respect to the target manufacturing period, for example. The target manufacturing period may also be called "takt time." The "delay status with respect to the target manufacturing period" includes various types of information available for judging whether a process in a step is delayed from usual time such as the presence or absence of the occurrence of delay from the target manufacturing period, the occurrence of abnormality or emergency stop in the step, an actually measured value of a period delayed from the target manufacturing period, and an expected delay period from the target manufacturing period.

The manufacturing status acquisition unit 316 acquires a manufacturing status in a pre-step 50 from the pre-step management device 52 and a manufacturing status in a post-step 60 as a destination of running of the vehicle 100 from the post-step management device 62. The manufacturing status acquisition unit 316 is not limited to the case of acquiring manufacturing statuses in the corresponding steps from the pre-step management device 52 and the post-step management device 62 but may acquire these manufacturing statuses from a production control system that collectively controls the steps in the factory FC. The feeding judgment unit 314 judges whether to feed the vehicle 100 using the manufacturing status acquired by the manufacturing status acquisition unit 316. The manufacturing status acquisition unit 316 may acquire a manufacturing status in a step performed after the post-step 60 instead of or together with the manufacturing status in the post-step 60.

The remote controller 312 transmits a control signal requesting remote control over the vehicle 100 to the vehicle 100 via the communication unit 390. When the vehicle 100 receives the request for remote control, an ECU 180 described later realizes driving control. As a result, the vehicle 100 runs automatically.

Various types of vehicles are applicable as the vehicle 100 such as a passenger car, a truck, a bus, and a vehicle for construction work. The vehicle 100 includes a communication unit 190, a power receiver 150, a motor 140, the battery 120, a power control unit (PCU) 130, and the electronic control unit (ECU) 180. The communication unit 190 is a radio communication device such as a dongle, for example, installed on the vehicle 100.

In the present embodiment, the vehicle 100 is a battery electric vehicle (BEV) capable of running by unmanned driving. The "unmanned driving" means driving independent of running operation by a passenger. The running operation means operation relating to at least one of "run," "turn," and "stop" of the vehicle 100. The unmanned driving is realized by automatic remote control or manual remote control using a device provided outside the vehicle 100 or by autonomous control by the vehicle 100. A passenger not involved in running operation may be on-board a vehicle running by the unmanned driving. The passenger not involved in running operation includes a person simply sitting in a seat of the vehicle 100 and a person doing work such as assembly, inspection, or operation of switches different from running operation while on-board the vehicle 100. Driving by running operation by a passenger may also be called "manned driving." In the present specification, the "remote control" includes "complete remote control" by which all motions of the vehicle 100 are completely determined from outside the vehicle 100, and "partial remote control" by which some of the motions of the vehicle 100 are determined from outside the vehicle 100. The "autonomous control" includes "complete autonomous control" by which the vehicle 100 controls a motion of the vehicle 100 autonomously without receiving any information from a device outside the vehicle 100, and "partial autonomous control" by which the vehicle 100 controls a motion of the vehicle 100 autonomously using information received from a device outside the vehicle 100.

The communication unit 190 transmits information such as an SOC of the battery 120 to the power feeder 200 and the server 300. The communication unit 190 may make communication using controller area network (CAN) communication used for control over the vehicle 100 and others. The CAN communication is a communication standard allowing multidirectional transmission or reception. The CAN communication provides mutual communication between the vehicle 100 and the power feeder 200. The communication unit 190 has a communication function of making radio communication via an access point 70 in the factory FC with a device outside the vehicle 100 such as the server 300 connected to the network 72, for example. This causes the vehicle 100 and the server 300 to communication with each other. The communication unit 190 may further use diagnosis communication. The diagnosis communication is a communication standard allowing request and response to be associated with each other on a one-to-one basis and used for diagnosis of failure, etc.

The power receiver 150 includes a receiving unit 152 and a receiving circuit 154. In the present embodiment, the receiving unit 152 is a feeding inlet conforming to a connector standard for the feeding connector 250 of the power feeder 200. The receiving circuit 154 is a rectifier and a DC/DC converter, for example. If alternating-current power is supplied from the receiving unit 152, the receiving circuit 154 converts the supplied alternating-current power to direct-current power using the rectifier, and supplies the direct-current power via the DC/DC converter to the battery 120 as a load. The rectifier and the DC/DC converter may be provided at the power feeder 200. In this case, direct-current power from the power feeder 200 is supplied to the power receiver 150.

The motor 140 is an alternating-current synchronous motor, for example, and functions as an electric motor and a generator. When the motor 140 functions as the electric motor, the motor 140 is driven by power stored in the battery 120 as a power source. Output from the motor 140 is transmitted through a decelerator and an axle to a wheel. During deceleration of the vehicle 100, the motor 140 functions as the generator using the rotation of the wheel to generate regenerative power.

The battery 120 is a chargeable secondary battery such as a lithium-ion battery or a nickel-hydrogen battery, for example. The battery 120 stores power to be used for running of the vehicle 100, and others. When the battery 120 receives power supplied to the power receiver 150 from the power feeder 200 and regenerative power generated by the motor 140, the battery 120 is charged to increase in SOC of the battery 120.

The PCU 130 is electrically connected to the battery 120 and the motor 140. The PCU 130 has an inverter, a boost converter, and a DC/DC converter. The inverter converts direct-current power supplied from the battery 120 to alternating-current power, and supplies the alternating-current power to the motor 140. The inverter converts regenerative power supplied from the motor 140 to direct-current power, and supplies the direct-current power to the battery 120. The boost converter boosts a voltage at the battery 120 when the power stored in the battery 120 is supplied to the motor 140. The DC/DC converter steps down the voltage at the battery 120 when the power stored in the battery 120 is supplied to an auxiliary, for example.

The ECU 180 is installed on the vehicle 100 and implements various types of control over the vehicle 100. The ECU 180 functions as a driving controller that implements driving control over the vehicle 100, for example. The "driving control" is adjustment of an acceleration, a speed, and a rudder angle, for example. The ECU 180 includes a memory such as an HDD, an optical recording medium, or a semiconductor memory, a CPU as a central processing unit, and others. The CPU executes various computer programs stored in the memory to realize various functions. Under remote control, the ECU 180 controls each actuator installed on the vehicle 100 in response to a control signal for the remote control received from the server 300 via the communication unit 190. In a feeding processing, the ECU 180 controls the receiving circuit 154 of the power receiver 150 to control charging of the battery 120. The ECU 180 controls the PCU 130 to control transfer of power between the battery 120 and the motor 140.

The factory FC is provided with the pre-step 50, the post-step 60, a track RT for the vehicle 100, a track BA for feeding continuous with the track RT, and a camera 80. The track RT connects the pre-step 50 and the post-step 60 to each other. The power feeder 200 is installed on the track BA for feeding.

The pre-step 50 is an assembly step of installing components on a vehicle body, for example. Various manufacturing steps are applicable as the pre-step 50 that allows the vehicle 100 to run by remote control after the vehicle 100 is processed in these steps. The pre-step 50 includes the pre-step management device 52 for controlling a manufacturing status in the pre-step 50.

The pre-step management device 52 is an information processor including a CPU 522 as a central processing unit, a memory 524 such as a ROM or a RAM, and a communication unit 54 for communication with the server 300. These units are connected to each other via an internal bus or an interface circuit. The CPU 522 executes a program stored in the memory 524 to realize some or all of functions such as a pre-step information acquisition unit 526. The pre-step information acquisition unit 526 acquires a manufacturing status about the vehicle 100 in the pre-step 50 from a camera or a sensor not shown in the drawings provided in the pre-step 50, for example. The pre-step information acquisition unit 526 transmits the acquired manufacturing status in the pre-step 50 to the server 300 via the communication unit 54.

The post-step 60 is an inspection step on the vehicle 100, for example. When permission of loading into the post-step 60 is given, the vehicle 100 having been delivered from the pre-step 50 to become an item to be processed in the post-step 60 is loaded into the post-step 60. After being subjected to the inspection step, the vehicle 100 is finished as a product and shipped. The post-step 60 includes the post-step management device 62 for controlling a manufacturing status in the post-step 60.

The post-step management device 62 is an information processor including a CPU 622 as a central processing unit, a memory 624 such as a ROM or a RAM, and a communication unit 64 for communication with the server 300. These units are connected to each other via an internal bus or an interface circuit. The CPU 622 executes a program stored in the memory 624 to realize some or all of functions such as a post-step information acquisition unit 626. The post-step information acquisition unit 626 acquires a manufacturing status about the vehicle 100 in the post-step 60 from a sensor not shown in the drawings provided in the post-step 60, for example. The post-step information acquisition unit 626 transmits the acquired manufacturing status in the post-step 60 to the server 300 via the communication unit 64.

The camera 80 is arranged between the pre-step 50 and the post-step 60. The camera 80 is fixed in such a manner as to allow capturing of images of the track RT and the track BA for feeding, and the vehicle 100 running on the track RT and the track BA for feeding. The camera 80 acquires the location of the vehicle 100 relative to the track RT and the track BA for feeding. The images captured by the camera 80 are used for remote control over the vehicle 100 by the remote controller 312 of the server 300. This configuration makes it possible to implement automatic running of the vehicle 100 by remote control without using a detector installed on the vehicle 100 that may be a camera, a millimeter wave radar, or LiDAR. Meanwhile, for a purpose such as prevention of collision during remote control by the system 500, a detector installed on the vehicle 100 may be used supplementarily.

Figure 2A:
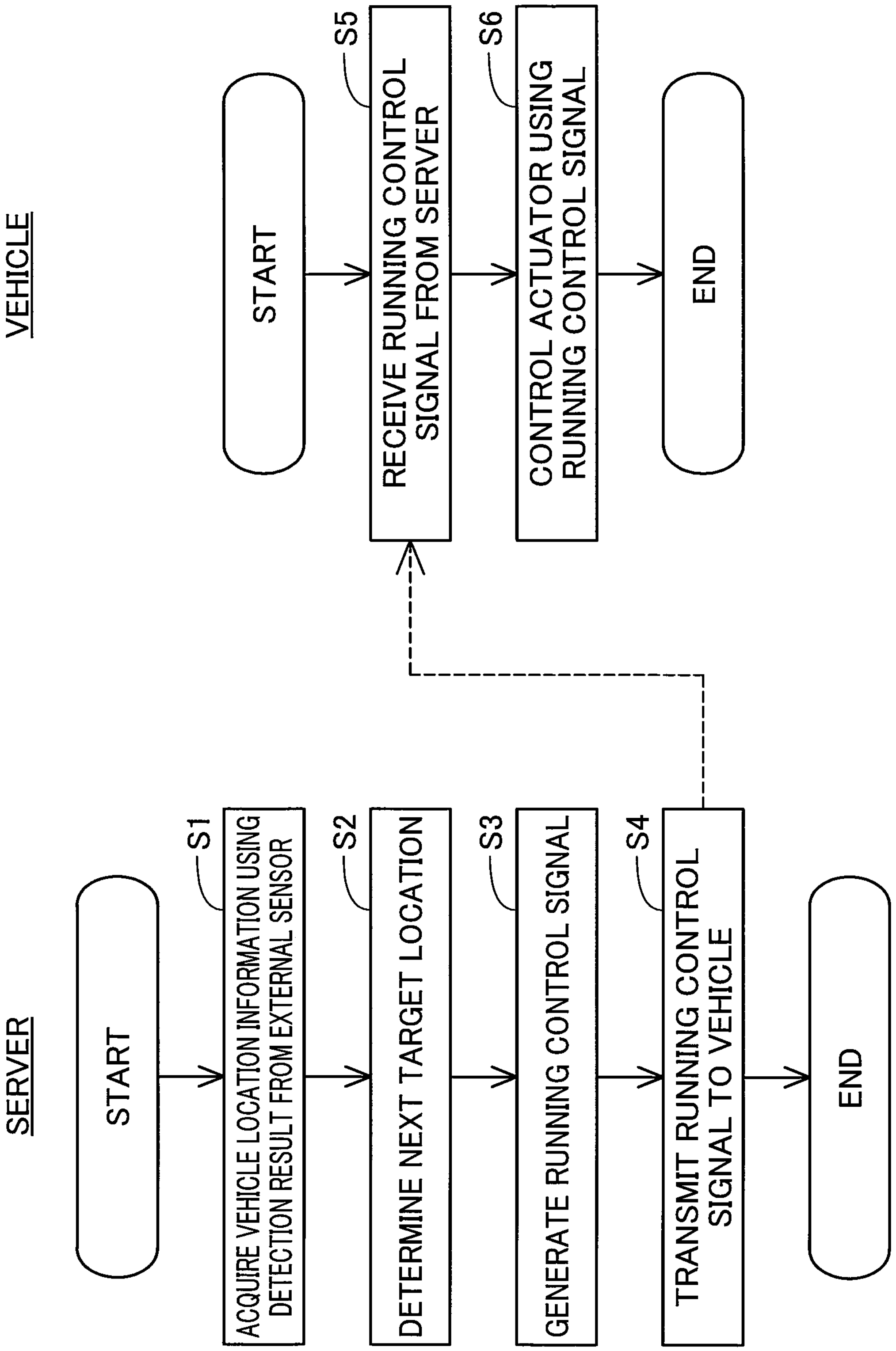
FIG. 2A is a flowchart showing a running method of causing a vehicle to run realized by a server.

FIG. 2A is a flowchart showing a running method of causing the vehicle 100 to run realized by the server 300. In step S1, the remote controller 312 acquires vehicle location information about the vehicle 100 using detection result output from an external sensor. The vehicle location information is locational information as a basis for generating a running control signal. In the present embodiment, the vehicle location information includes the location and orientation of the vehicle 100 in a reference coordinate system of the factory FC. In the present embodiment, the reference coordinate system of the factory FC is the global coordinate system and a location in the factory FC can be expressed by X, Y, and Z coordinates in the global coordinate system. The external sensor is a sensor located outside the vehicle 100. In the present embodiment, the camera 80 is used as the external sensor. The detection result is an image captured by the camera 80. Specifically, the camera 80 as the external sensor captures the vehicle 100, and outputs the captured image as the detection result. The location of the camera 80 in the factory FC is adjusted in advance. The remote controller 312 acquires the vehicle location information about the vehicle 100 using the captured image acquired from the camera 80 as the external sensor.

More specifically, in step S1, the remote controller 312 for example, determines the outer shape of the vehicle 100 from the captured image, calculates the coordinates of a positioning point of the vehicle 100 in a coordinate system of the captured image, namely, in a local coordinate system, and converts the calculated coordinates to coordinates in the global coordinate system, thereby acquiring the location of the vehicle 100. The outer shape of the vehicle 100 in the captured image may be detected by inputting the captured image to a detection model using artificial intelligence, for example. The detection model is prepared in the system 500 or outside the system 500. The detection model is stored in advance in the storage device 320, for example. An example of the detection model is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 100, and a label showing whether each region in the training image is a region indicating the vehicle 100 or a region indicating a subject other than the vehicle 100, for example. In training the CNN, a parameter for the CNN is preferably updated through backpropagation in such a manner as to reduce error between output result obtained by the detection model and the label.

In step S1, the remote controller 312 can acquire the orientation of the vehicle 100 through estimation based on the direction of a motion vector of the vehicle 100 detected from change in location of a feature point of the vehicle 100 between frames of the captured images using optical flow process, for example. The orientation of the vehicle 100 may be calculated using output result from an internal sensor that may be an acceleration sensor or a yaw rate sensor mounted on the vehicle 100, for example. The internal sensor is a sensor mounted on the vehicle 100.

In step S2, the remote controller 312 determines a target location to which the vehicle 100 is to move next. In the present embodiment, the target location is expressed by X, Y, and Z coordinates in the global coordinate system of the factory. The storage device 320 of the server 300 contains a reference route stored in advance as a route along which the vehicle 100 is to run. In the present embodiment, a target route described later corresponds to the reference route. The route is expressed by a node indicating a departure place, a node indicating a way point, a node indicating a destination, and a link connecting nodes to each other. The remote controller 312 determines the target location to which the vehicle 100 is to move next using the vehicle location information and the reference route. The remote controller 312 determines the target location on the reference route ahead of a current location of the vehicle 100.

In step S3, the remote controller 312 generates a running control signal for causing the vehicle 100 to run toward the determined target location. In the present embodiment, the running control signal includes an acceleration and a steering angle of the vehicle 100 as parameters. The remote controller 312 calculates a running speed of the vehicle 100 from transition of the location of the vehicle 100 and makes comparison between the calculated running speed and a target speed of the vehicle 100 determined in advance. If the running speed is lower than the target speed, the remote controller 312 generally determines an acceleration in such a manner as to accelerate the vehicle 100. If the running speed is higher than the target speed as, the remote controller 312 generally determines an acceleration in such a manner as to decelerate the vehicle 100. If the vehicle 100 is on the reference route, remote controller 312 determines a steering angle and an acceleration in such a manner as to prevent the vehicle 100 from deviating from the reference route. If the vehicle 100 is not on the reference route, in other words, if the vehicle 100 deviates from the reference route, the remote controller 312 determines a steering angle and an acceleration in such a manner as to return the vehicle 100 to the reference route. In other embodiments, the running control signal may include the speed of the vehicle 100 as a parameter instead of or in addition to the acceleration of the vehicle 100.

In step S4, the remote controller 312 transmits the generated running control signal to the vehicle 100. The remote controller 312 repeats the acquisition of vehicle location information, the determination of a target location, the generation of a running control signal, the transmission of the running control signal, and others in a predetermined cycle.

In step S5, the driving controller of the vehicle 100, namely, the ECU 180 receives the running control signal from the remote controller 312. In step S6, the ECU 180 controls an actuator using the received running control signal, thereby causing the vehicle 100 to run at the acceleration and the steering angle indicated by the running control signal. The actuator controlled in step S6 includes an actuator of a driving device for accelerating the vehicle 100, an actuator of a steering device for changing a traveling direction of the vehicle 100, and an actuator of a braking device for decelerating the vehicle 100. The ECU 180 repeats the reception of a running control signal and the control over the actuator in a predetermined cycle. By causing the vehicle 100 to run by remote control as described above, it becomes possible to move the vehicle 100 without using a transport unit such as a crane or a conveyor.

Figure 2B:
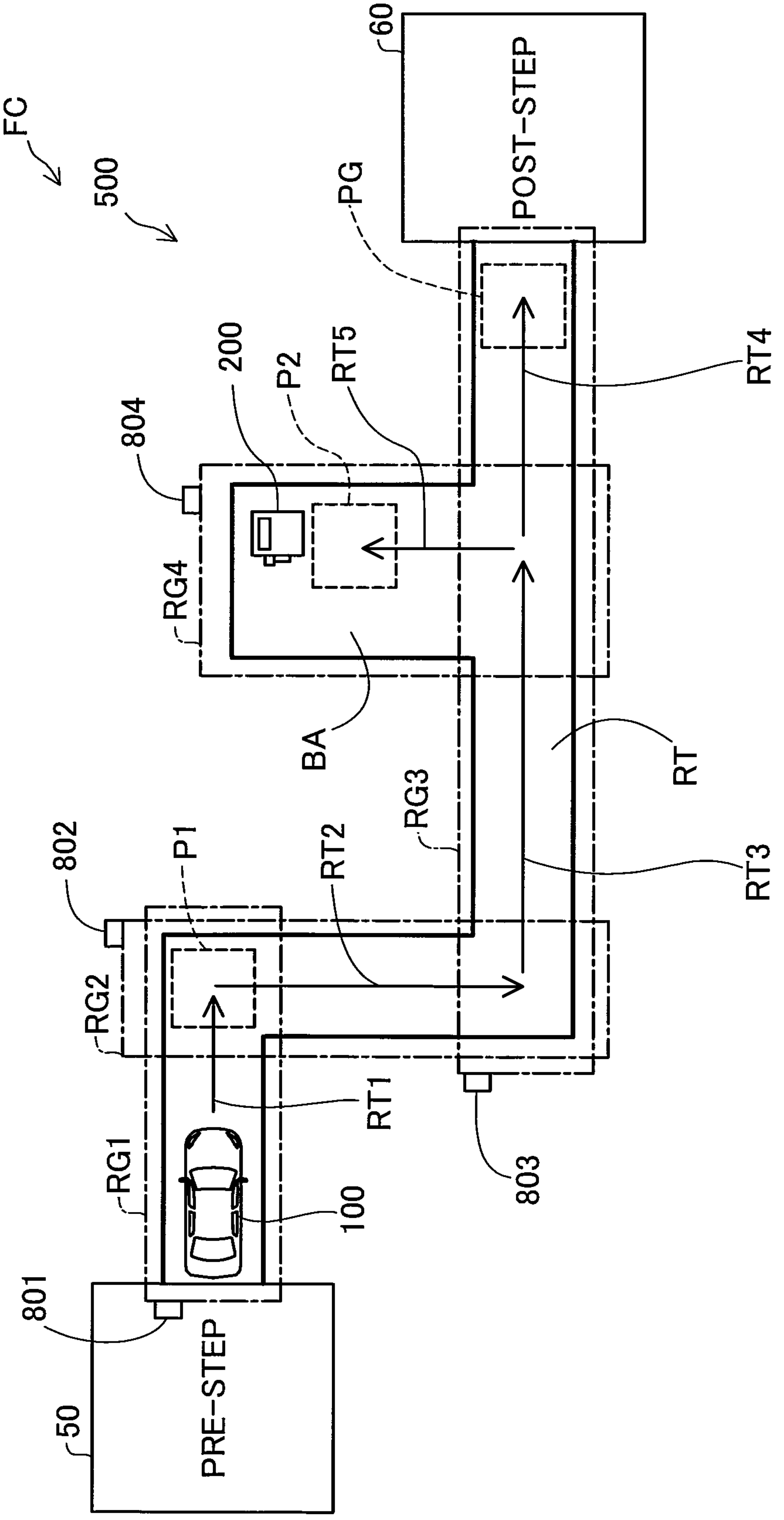
FIG. 2B is an explanatory view showing remote control over the vehicle by a remote controller.

FIG. 2B is an explanatory view showing remote control over the vehicle 100 by the remote controller 312. In the illustration in FIG. 2B, the track RT includes a first track RT1, a second track RT2, a third track RT3, and a fourth track RT4. The first track RT1 and the second track RT2 are connected to each other across a right-angled curve. The track BA for feeding is connected between the third track RT3 and the fourth track RT4.

As shown in FIG. 2B, the camera 80 acquires images of the vehicle 100 on the track RT and the track BA for feeding viewed from above. The number of the cameras 80 is set to a number allowing imaging of the track RT and the track BA for feeding entirely by giving consideration to angles of view of the cameras 80, etc. In the illustration in FIG. 2B, the camera 80 includes a camera 801 allowing imaging of a range RG1 covering the first track RT1 entirely, a camera 802 allowing imaging of a range RG2 covering the second track RT2 entirely, a camera 803 allowing imaging of a range RG3 covering the third track RT3 and the fourth track RT4 entirely, and a camera 804 allowing imaging of a range RG4 covering the track BA for feeding entirely. The camera 80 may acquire not only an image captured from above the vehicle 100 but also an image captured from the front, back, or side of the vehicle 100, for example.

The track RT has a target route set in advance as a route along which the vehicle 100 is to run. The remote controller 312 causes the ECU 180 to implement driving control over the vehicle 100 in such a manner as to cause the vehicle 100 to run along the target route while analyzing images of the track RT and the vehicle 100 acquired by the camera 80 and adjusting the location of the vehicle 100 relative to the target route. For the image analysis for the remote control, an image of the entire vehicle 100 may be used or an image of a part of the vehicle 100 such as an alignment mark given to the vehicle 100 may be used.

The camera 801 and the camera 802 are configured in such a manner that, at a connecting location between tracks such as a location P1 shown in FIG. 2B, the angle of view of the camera 801 and the angle of view of the camera 802 overlap each other. The vehicle 100 having been delivered from the pre-step 50 runs to the location P1 by remote control by which a captured image acquired by the camera 801 is analyzed. After the vehicle 100 arrives at the location P1, the vehicle 100 runs on the second track RT2 by remote control using a captured image acquired by the camera 802 instead of the camera 801. Likewise, an image captured by the camera 803 is used for running on the third track RT3 and the fourth track RT4, and an image captured by the camera 804 is used for running on the track BA for feeding. In this way, the remote controller 312 implements remote control while switching a captured image to be analyzed properly based on the range of the track RT. In normal time when the feeding processing is not performed, the remote controller 312 causes the vehicle 100 to run on the track RT to a loading location PG for loading into the post-step 60.

From the viewpoint of improving production efficiency, in order to avoid the occurrence of deviation from a target manufacturing period, timing of causing the vehicle 100 having been delivered from the pre-step 50 to arrive at the loading location PG is adjusted in such a manner as to conform to timing when the vehicle 100 becomes loadable into the post-step 60. The timing of arrival at the post-step 60 is adjustable using a processing period in each step, timing of delivery from the pre-step 50, a running speed of the vehicle 100 on the track RT, etc. For example, if abnormality or delay has occurred in the post-step 60 so permission of loading of the vehicle 100 into the post-step 60 is not given, timing of arrival of the vehicle 100 might become earlier so the vehicle 100 might be placed on standby on the track RT or the track BA for feeding such as at the loading location PG. In this case, the vehicle 100 is to consume the battery 120 more than usual. This might cause quality reduction of the battery 120 or prohibit the vehicle 100 from running.

In the system 500, it is judged whether to charge the battery 120 using a manufacturing status in the post-step 60. More specifically, the feeding judgment unit 314 judges whether to feed the vehicle 100 using information about the manufacturing status in the post-step 60. In the present embodiment, the feeding judgment unit 314 further uses an SOC of the battery 120 in judging whether to feed the vehicle 100. If the vehicle 100 is judged to be fed, the system 500 performs the feeding processing for bringing the vehicle 100 to a state feedable using the power feeder 200. The "state in which the vehicle 100 is feedable using the power feeder 200" includes a state in which the vehicle 100 is feedable from the power feeder 200 automatically through control by each unit in the system 500, and a state in which the vehicle 100 is feedable from the power feeder 200 manually by an operator, for example. The "state in which the vehicle 100 is automatically feedable" includes a state in which the vehicle 100 is fed from the power feeder 200 automatically by moving the vehicle 100, and a state in which the vehicle 100 is fed from the power feeder 200 automatically without moving the vehicle 100. The "state in which the vehicle 100 is manually feedable" includes a state in which the vehicle 100 becomes feedable through manual operation by an operator by moving the vehicle 100 to a location allowing the vehicle 100 to be fed manually from the power feeder 200, and a state in which the vehicle 100 becomes feedable through manual operation by an operator without moving the vehicle 100. The "state in which the vehicle 100 is manually feedable" further includes a notification to an operator, for example, for prompting the operator to feed the vehicle 100 using the power feeder 200.

In the present embodiment, if the vehicle 100 is judged to be fed, the remote controller 312 causes the vehicle 100 to run to the track BA for feeding by remote control and brings the vehicle 100 to a feedable state. More specifically, the remote controller 312 causes the vehicle 100 to run to a location P2 where the vehicle 100 is brought to a state manually feedable using the power feeder 200. Furthermore, a notification may be made to an operator, for example, to feed the vehicle 100 manually using the power feeder 200 for prompting the operator to implement manual feeding. The notification may be made on a display screen such as a display of the post-step management device 62 or by voice through a speaker installed on the power feeder 200 or the vehicle 100, for example.

Figure 3:
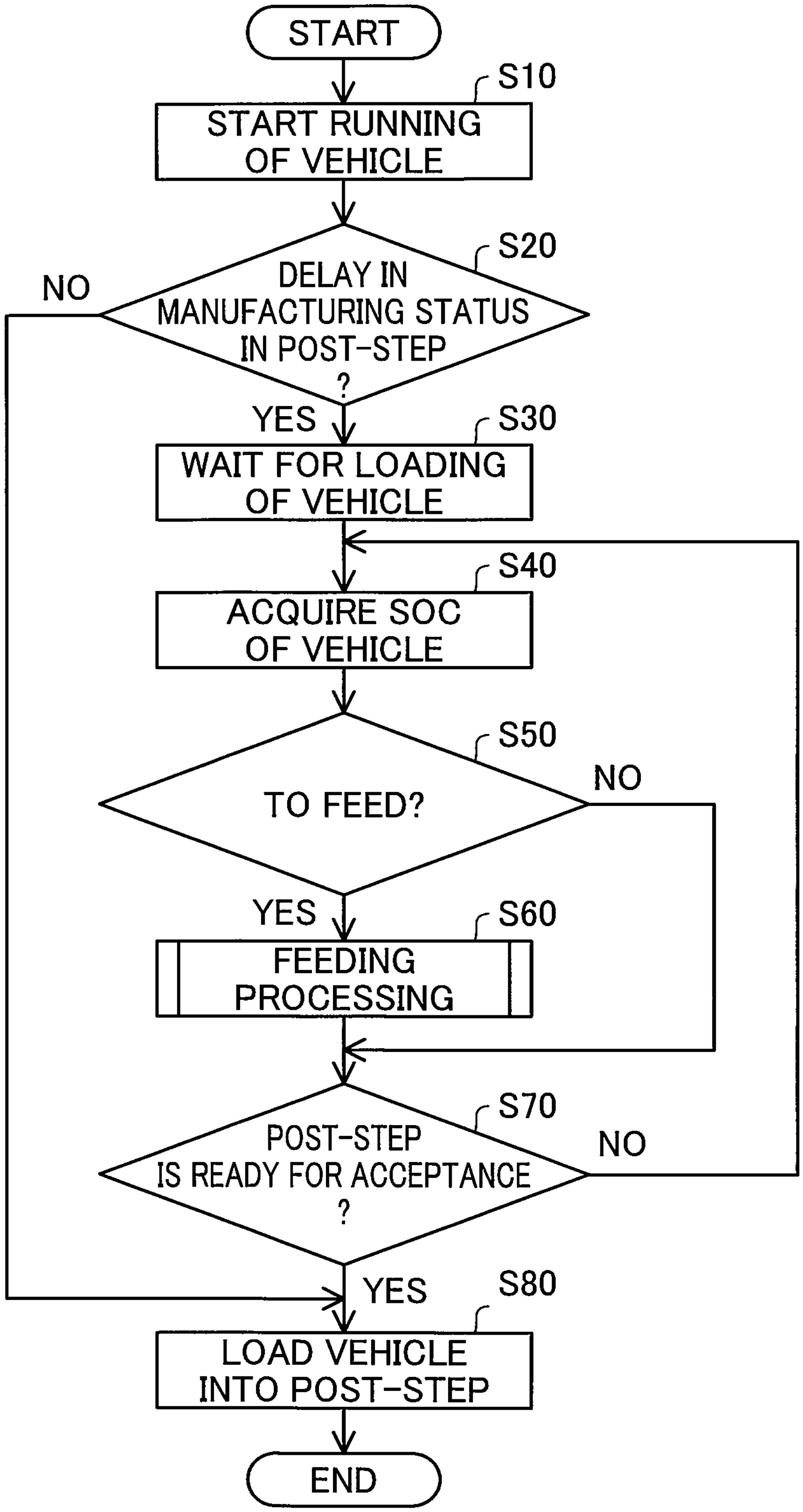
FIG. 3 is a flowchart showing a method of manufacturing the vehicle implemented by the system.

FIG. 3 is a flowchart showing a method of manufacturing the vehicle 100 implemented by the system 500 according to the present embodiment. The flow shown in FIG. 3 is started by the manufacturing status acquisition unit 316 having detected completion of the process in the pre-step 50 or request from the post-step 60 to load the vehicle 100.

In step S10, the remote controller 312 causes the vehicle 100 to run toward the post-step 60 by remote control. The feeding judgment unit 314 starts a feeding judgment process of judging whether to feed the vehicle 100. In step S20, the feeding judgment unit 314 checks a manufacturing status in the post-step 60. More specifically, the manufacturing status acquisition unit 316 acquires the manufacturing status in the post-step 60, and the feeding judgment unit 314 judges whether there is delay in the post-step 60 using the acquired manufacturing status in the post-step 60. The feeding judgment unit 314 checks the manufacturing status in the post-step 60 repeatedly at a predetermined interval such as once every second, for example, during running of the vehicle 100 to the post-step 60. Meanwhile, the manufacturing status in the post-step 60 may be checked only with predetermining timing such as timing when the vehicle 100 arrives at the loading location PG for loading into the post-step 60, for example. If there is no delay in the manufacturing status in the post-step 60 until the vehicle 100 arrives at the loading location PG (S20: NO), the processing moves to step S80.

If there is delay in the post-step 60 (S20: YES), the processing moves to step S30. In step S30, the remote controller 312 stops the vehicle 100 temporarily and waits for loading of the vehicle 100. The vehicle 100 may be stopped at the loading location PG for loading into the post-step 60, the location P2 on the track BA for feeding shown in FIG. 2B, or an arbitrary location on the track RT. In step S40, the SOC acquisition unit 318 requests the vehicle 100 to transmit an SOC and acquires the SOC from the vehicle 100. The SOC acquisition unit 318 may acquire a cell voltage from the vehicle 100, for example, and calculate an SOC from the acquired cell voltage.

In step S50, the feeding judgment unit 314 checks the acquired SOC and judges whether to feed the battery 120. For example, the feeding judgment unit 314 compares the SOC with a target value defined in advance, and judges that the battery 120 is to be fed if the SOC is lower than the target value. The target value is settable to any value such as 20%, 25%, 30%, or 50%, for example. The target value for the SOC is set for each destination country as a destination after the manufacture, for example. In order to suppress or prevent deterioration of the battery 120 due to reduction in the SOC, the target value to be used may be a lower specification limit (LSL) from the viewpoint of quality control over the SOC, for example. In order to suppress or prevent deterioration of the battery 120 due to overcharging, the target value is preferably set to a value lower than an upper specification limit (USL) from the viewpoint of quality control over the SOC.

If the feeding judgment unit 314 judges that feeding is to be implemented (S50: YES), the processing moves to step S60. In step S60, the feeding processing is performed for bringing the vehicle 100 to a feedable state. If the feeding judgment unit 314 judges that feeding is not to be implemented (S50: NO), the processing moves to step S70. In step S70, the remote controller 312 waits for permission of loading from the post-step 60. In the absence of permission of loading from the post-step 60 (S70: NO), the remote controller 312 moves the processing to step S40. If abnormality in the post-step 60 has resolved and the post-step 60 becomes ready for acceptance (S70: YES), the remote controller 312 moves the processing to step S80. In step S80, the remote controller 312 causes the vehicle 100 to run by remote control and loads the vehicle 100 into the post-step 60. The remote controller 312 moves the vehicle 100 to a location where the vehicle 100 is deliverable to the post-step 60, and then finishes the processing.

Figure 4:
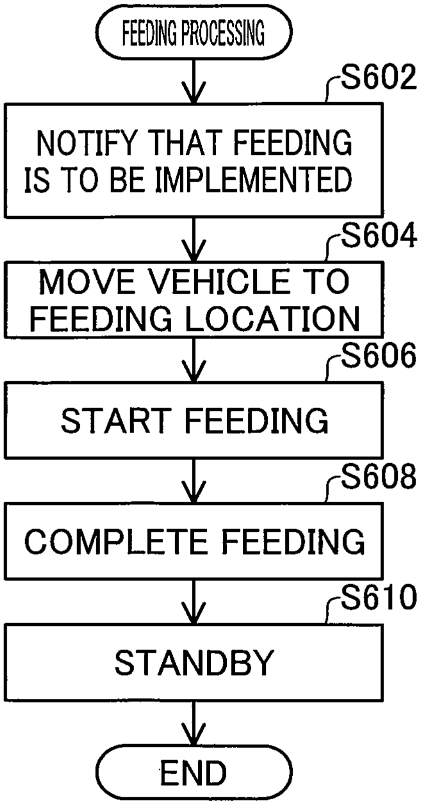
FIG. 4 is a flowchart showing a feeding processing according to the first embodiment.

FIG. 4 is a flowchart showing the feeding processing according to the first embodiment. In step S602, the feeding judgment unit 314 notifies an operator responsible for manual feeding using the power feeder 200 of the judgment result that feeding is to be implemented. In step S604, the remote controller 312 causes the vehicle 100 to run by remote control to the location P2 on the track BA for feeding. The location P2 is a location where the vehicle 100 is manually feedable using the power feeder 200. In step S606, the operator connects the feeding connector 250 of the power feeder 200 to the receiving unit 152 of the vehicle 100 in a state of having finished running, and starts to feed the battery 120. In step S608, the operator completes the feeding operation by charging the battery 120 to a predetermined SOC such as a target value in terms of process control over the SOC, for example. The feeding controller 212 may acquire an SOC from the vehicle 100 through the CAN communication and adjust a charging amount based on the acquired SOC. In step S610, the remote controller 312 places the vehicle 100 on standby at a predetermined standby location, and then finishes the processing. The standby location of the vehicle 100 is preferably the location P2 on the track BA for feeding allowing the vehicle 100 to wait for additional feeding or the loading location PG for loading into the post-step 60 in which the vehicle 100 is on standby waiting to be loaded into the post-step 60.

As described above, the system 500 of the present embodiment includes: the remote controller 312 remotely controlling running of the vehicle 100 capable of running in the factory FC, the vehicle 100 including the communication unit 190 having a communication function for remote control and the battery 120; the power feeder 200 available for charging the battery 120; the manufacturing status acquisition unit 316 acquiring information about a manufacturing status in the factory FC; and the feeding judgment unit 314 judging whether to feed the vehicle 100 using the acquired information about the manufacturing status. If the feeding judgment unit 314 judges that the vehicle is to be fed, the remote controller 312 moves the vehicle 100 to the location P2 by remote control and brings the vehicle 100 to a state feedable using the power feeder 200. Thus, if the vehicle 100 is not permitted to be loaded into the post-step 60 during automatic driving of the vehicle 100 from the pre-step 50 to the post-step 60 by remote control, it is possible to feed the vehicle 100 using a standby period. This suppresses or prevents excessive reduction in an SOC of the battery 120 during the course of manufacture of the vehicle 100, making it possible to reduce or eliminate a likelihood of trouble such as quality reduction of the battery 120 or impossibility for the vehicle 100 to run occurring before loading into the post-step 60.

The system 500 of the present embodiment further includes the SOC acquisition unit 318 acquiring an SOC of the battery 120. The feeding judgment unit 314 judges whether to feed the vehicle 100 using the acquired SOC of the battery 120 further together with the manufacturing status in the factory FC. According to the system 500 of the present embodiment, by monitoring the SOC, it is possible to implement appropriate feeding responsive to the SOC of the battery 120. This achieves suppression or prevention of overcharging of the battery 120, etc.

In the system 500 of the present embodiment, the manufacturing status acquisition unit 316 acquires a delay status with respect to a target manufacturing period in the post-step 60 as the information about the manufacturing status. If delay with respect to the target manufacturing period has occurred and if the SOC of the battery 120 is lower than a target value, the feeding judgment unit 314 judges that the vehicle 100 is to be fed. Thus, it is possible to adjust the SOC at an intended value using a period generated as a result of delay in manufacture in the post-step 60 such as a standby period waiting to be loaded into the post-step 60.

In the system 500 of the present embodiment, if the feeding judgment unit 314 judges that the vehicle 100 is to be fed, the remote controller 312 moves the vehicle 100 to the location P2 where the vehicle 100 is feedable using the power feeder 200. Thus, even if the power feeder 200 is arranged at a location distanced from the track RT, it is still possible to facilitate the feeding processing on the vehicle 100 by moving the vehicle 100 to the power feeder 200 automatically.

B. Second Embodiment

Figure 5:
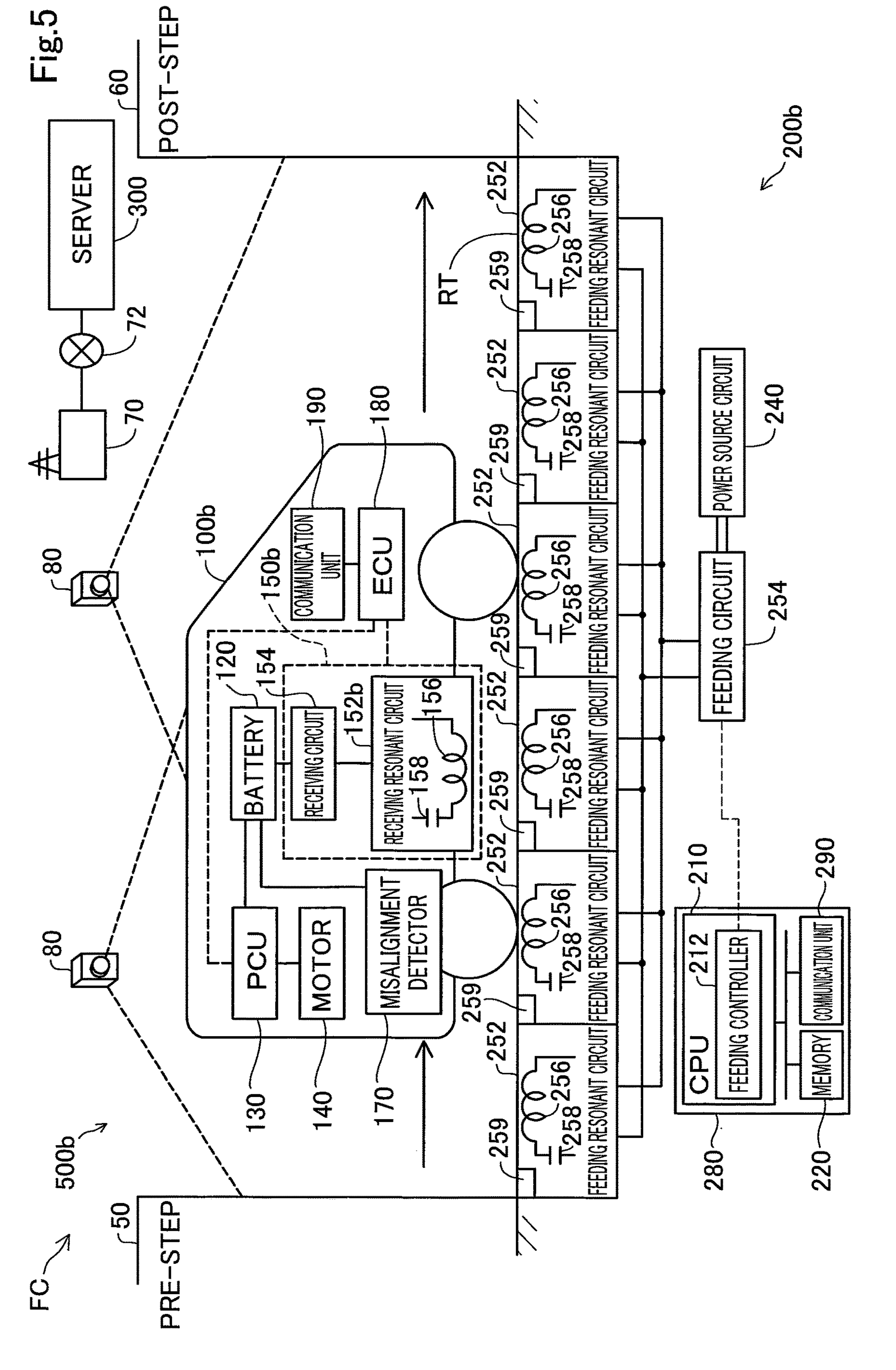
FIG. 5 is an explanatory view showing a schematic configuration of a system according to a second embodiment.

FIG. 5 is an explanatory view showing a schematic configuration of a system 500*b* according to a second embodiment. The system 500*b* of the second embodiment differs from the system 500 of the first embodiment in that the system 500*b* includes a power feeder 200*b* forming part of a non-contact power feeding system instead of the power feeder 200, and is the same as the system 500 in the other configuration.

The non-contact power feeding system includes the power feeder 200*b* and a power receiver 150*b* provided at a vehicle 100*b*. The non-contact power feeding system transfers power in a non-contact manner to the power receiver 150*b* of the vehicle 100*b* during running on the track RT through magnetic field resonant coupling (magnetic field resonance) from the power feeder 200*b* to the vehicle 100*b*. "During running of the vehicle 100*b*" means a state in which the vehicle 100*b* is on a road for running, and includes not only a state in which the vehicle 100*b* is actually running at an arbitrary speed greater than zero but also a state in which the vehicle 100 is temporarily stopping on a track.

The power feeder 200*b* is a non-contact power feeder including a feeding control device 280, a power source circuit 240, a feeding circuit 254, and a plurality of feeding resonant circuits 252. In the present embodiment, a plurality of the feeding resonant circuits 252, the feeding circuit 254, and the power source circuit 240 are buried in the track RT. Alternatively, the feeding resonant circuits 252, the feeding circuit 254, and the power source circuit 240 may be exposed on the track RT.

The power source circuit 240 is an AC/DC converter circuit, for example. The power source circuit 240 converts alternating-current power supplied from an alternating-current power source such as a system power source to direct-current power, and supplies the direct-current power to the feeding circuit 254. The feeding circuit 254 is a unit including an inverter, etc. The feeding circuit 254 converts the direct-current power supplied from the power source circuit 240 to alternating-current power of an operating frequency, and supplies the alternating-current power to a plurality of the feeding resonant circuits 252. In the present embodiment, the feeding circuit 254 is controlled by the feeding controller 212. As a result, the power supplied from the feeding resonant circuit 252 to the power receiver 150*b* is controlled. The feeding circuit 254 may include a rectifier circuit, a filter circuit, and others. The power source may be another alternating-current power source to supply three-phase alternating-current power, or may be a direct-current power source such as a fuel cell.

The feeding resonant circuit 252 includes a feeding coil 256 and a feeding resonant capacitor 258. Parameters for the feeding coil 256 and the feeding resonant capacitor 258, which may be the outer diameter and inner diameter of the feeding coil 256, the number of turns of the feeding coil 256, and the electrostatic capacitance of the feeding resonant capacitor 258, for example, are defined in such a manner that the resonant frequency of the feeding resonant circuit 252 conforms to a predetermined set value. The resonant frequency is 85 kHz, for example, which is defined according to SAE TIR J2954 standard as a frequency band for non-contact power transfer.

In the present embodiment, the feeding resonant circuits 252 are arranged over the entire track RT from the pre-step 50 to the post-step 60. Each of the feeding resonant circuits 252 is arranged in such a manner that the center of the feeding coil 256 is located at the center of a lane of the track RT. When high-frequency power is supplied from the feeding circuit 254 to the feeding resonant circuit 252, the feeding resonant circuit 252 transfers alternating-current power induced in the feeding coil 256 to the power receiver 150*b* of the vehicle 100*b* using an electromagnetic induction phenomenon.

As shown in FIG. 5, the vehicle 100*b* differs from the vehicle 100 shown in the first embodiment in that the vehicle 100*b* includes the power receiver 150*b* instead of the power receiver 150, and that the vehicle 100*b* further includes a misalignment detector 170. The power receiver 150*b* includes a receiving resonant circuit 152*b* and a receiving circuit 154 configured in the same way as that of the first embodiment. The receiving circuit 154 converts alternating-current power received from the power feeder 200*b* to direct-current power, and supplies the direct-current power to the battery 120.

The receiving resonant circuit 152*b* is arranged at the bottom of the vehicle 100*b* in such a manner as to reduce a distance from a road surface of the track RT, for example. The receiving resonant circuit 152*b* includes a receiving coil 156 and a receiving resonant capacitor 158. Various parameters for the receiving coil 156 and the receiving resonant capacitor 158 are defined in such a manner that the resonant frequency of the receiving resonant circuit 152*b* conforms to the resonant frequency of the feeding resonant circuit 252. The parameters include the outer diameter and inner diameter of the receiving coil 156, the number of turns of the receiving coil 156, and the electrostatic capacitance of the receiving resonant capacitor 158, for example.

When the receiving resonant circuit 152*b* and the feeding resonant circuit 252 are brought to a state of facing each other, an alternating magnetic field is generated by the feeding resonant circuit 252. Vibration of the generated alternating magnetic field is transmitted to the receiving resonant circuit 152*b* to resonate at the same resonant frequency as the feeding resonant circuit 252. As a result, an induced current is caused to flow in the receiving resonant circuit 152*b* by electromagnetic induction to generate induced electromotive power in the receiving resonant circuit 152*b* by the induced current.

The misalignment detector 170 detects misalignment between the receiving resonant circuit 152*b* and the feeding resonant circuit 252. The misalignment detector 170 forms a misalignment detection device together with a magnetic field detector 259 provided at the power feeder 200*b*. The misalignment detector 170 includes an alternating magnetic field generating circuit and an alternating-current power generating circuit not shown in the drawings, for example.

The alternating magnetic field generating circuit includes a resonant coil and a resonant capacitor, for example, and generates an alternating magnetic field for acquiring the locations of the feeding resonant circuit 252 and the receiving resonant circuit 152*b* relative to each other. The alternating-current power generating circuit is electrically connected to the battery 120 and the alternating magnetic field generating circuit. The alternating-current power generating circuit includes an oscillation circuit such as an inverter, and an amplifier, for example. The oscillation circuit converts direct-current power supplied from the battery 120 to alternating-current power of a predetermined frequency. The amplifier amplifies the alternating-current power from the oscillation circuit. The alternating-current power generating circuit generates the alternating-current power and supplies the alternating-current power to the alternating magnetic field generating circuit.

As shown in FIG. 5, the magnetic field detector 259 is a magneto-impedance (MI) sensor to detect a magnetic field, for example. The magnetic field detector 259 is arranged inside the track RT or on the track RT. In the illustration in FIG. 5, the magnetic field detector 259 is provided for each feeding resonant circuit 252. Alternatively, the magnetic field detector 259 may be a hall sensor or a magneto resistive (MR) effect sensor, for example. The number of the magnetic field detectors 259 may be one. In this case, the magnetic field detector 259 may be arranged at a location closer to the pre-step 50 than the feeding resonant circuit 252 on the track RT.

The magnetic field detector 259 detects an alternating magnetic field for misalignment detection generated from the vehicle 100*b*. The feeding controller 212 detects the presence or absence of misalignment between the receiving resonant circuit 152*b* and the feeding resonant circuit 252 based on the result of the detection from the magnetic field detector 259. Here, if the efficiency of power transfer from the power feeder 200*b* to the power receiver 150*b* is the highest, a magnetic field detected by the magnetic field detector 259 has the highest intensity. The feeding controller 212 monitors the intensity of a detected magnetic field, and detects a location where the intensity of the magnetic field becomes maximum or a location where the intensity of the magnetic field becomes equal to or higher than a threshold defined in advance as a location of the highest efficiency of power transfer from the power feeder 200*b* to the power receiver 150*b*.

Figure 6:
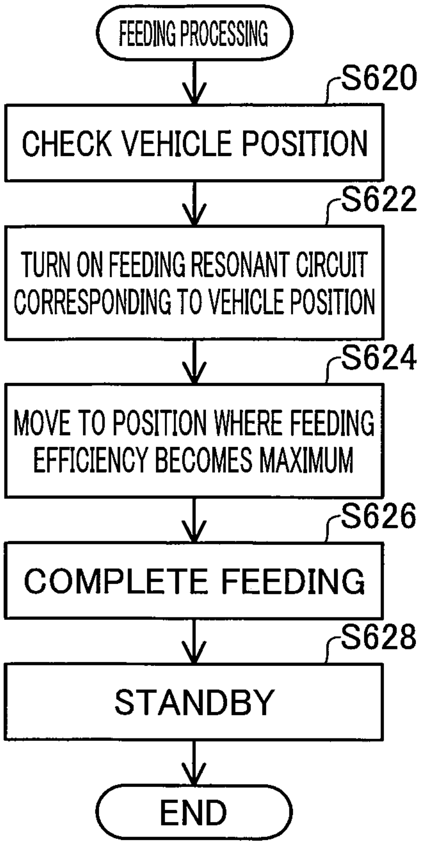
FIG. 6 is a flowchart showing a feeding processing according to the second embodiment.

FIG. 6 is a flowchart showing a feeding processing according to the second embodiment. At the time of start of this flow, all the feeding resonant circuits 252 are turned off and in a non-resonant state. In the present embodiment, the vehicle 100*b* is fed automatically from the power feeder 200*b* without moving the vehicle 100*b*, thereby bringing the vehicle 100*b* to a state feedable using the power feeder 200*b*.

In step S620, if the feeding controller 212 accepts judgment result made by the feeding judgment unit 314 that feeding is to be implemented, the feeding controller 212 checks the location of the vehicle 100*b* on the track RT. The location of the vehicle 100 on the track RT is detectable using detection result from the misalignment detector 170 and the magnetic field detector 259, and is also detectable by detecting a state in which the receiving resonant circuit 152*b* and the feeding resonant circuit 252 face each other using a current value, a voltage value, or an impedance value in the power receiver 150*b* or the power feeder 200*b*, for example. The location of the vehicle 100*b* may be detected by various methods such as narrowband communication using an RF tag and image detection using a camera.

In step S622, the feeding controller 212 turns on the feeding resonant circuit 252 corresponding to the location of the vehicle 100. As a result, non-contact feeding is started from the power feeder 200*b* to the power receiver 150*b*. All the feeding resonant circuits 252 provided at the track RT may be turned on. In this case, step S620 is omitted to achieve simplification of the processing.

In step S624, the remote controller 312 moves the vehicle 100*b* by remote control to a location where feeding efficiency becomes maximum. More specifically, the feeding controller 212 monitors the intensity of a magnetic field detected by the magnetic field detector 259, and detects the location of maximum feeding efficiency as a location where the efficiency of power transfer from the power feeder 200*b* to the power receiver 150*b* is the highest. By moving the vehicle 100*b* repeatedly while monitoring the efficiency of transfer of power supplied from the power feeder 200*b* to the power receiver 150*b* during the feeding, the location of the vehicle 100*b* is converged to a location where power transfer efficiency becomes maximum. If the vehicle 100*b* is fed in a standby state at a predetermined location, both the location of the vehicle 100*b* in a traveling direction and the location of the vehicle 100*b* in a vehicle width direction are adjusted at locations where power transfer efficiency becomes maximum.

In step S626, the feeding controller 212 completes the feeding by charging the battery 120 to a predetermined SOC such as a target value in terms of process control over the SOC, for example. In step S628, the remote controller 312 places the vehicle 100*b* on standby at a predetermined standby location and then finishes the processing.

In the system 500*b* of the present embodiment, the power feeder 200*b* is configured using the non-contact power feeder provided in the factory FC. If the feeding judgment unit 314 judges that the vehicle 100*b* is to be fed, feeding using the non-contact power feeder is started. This allows the vehicle 100*b* to be fed during running by remote control from the pre-step 50 to the post-step 60, for example, making it possible to adjust an SOC of the battery 120 efficiently. As a result, it is possible to adjust the SOC of the battery 120 at a predetermined value while suppressing or preventing reduction in production efficiency.

In the system 500*b* of the present embodiment, the remote controller 312 moves the vehicle 100*b* to a location where power transfer efficiency of power received from the feeding resonant circuit 252 becomes maximum. This further improves efficiency in feeding the vehicle 100*b* during running.

C. Third Embodiment

Figure 7:
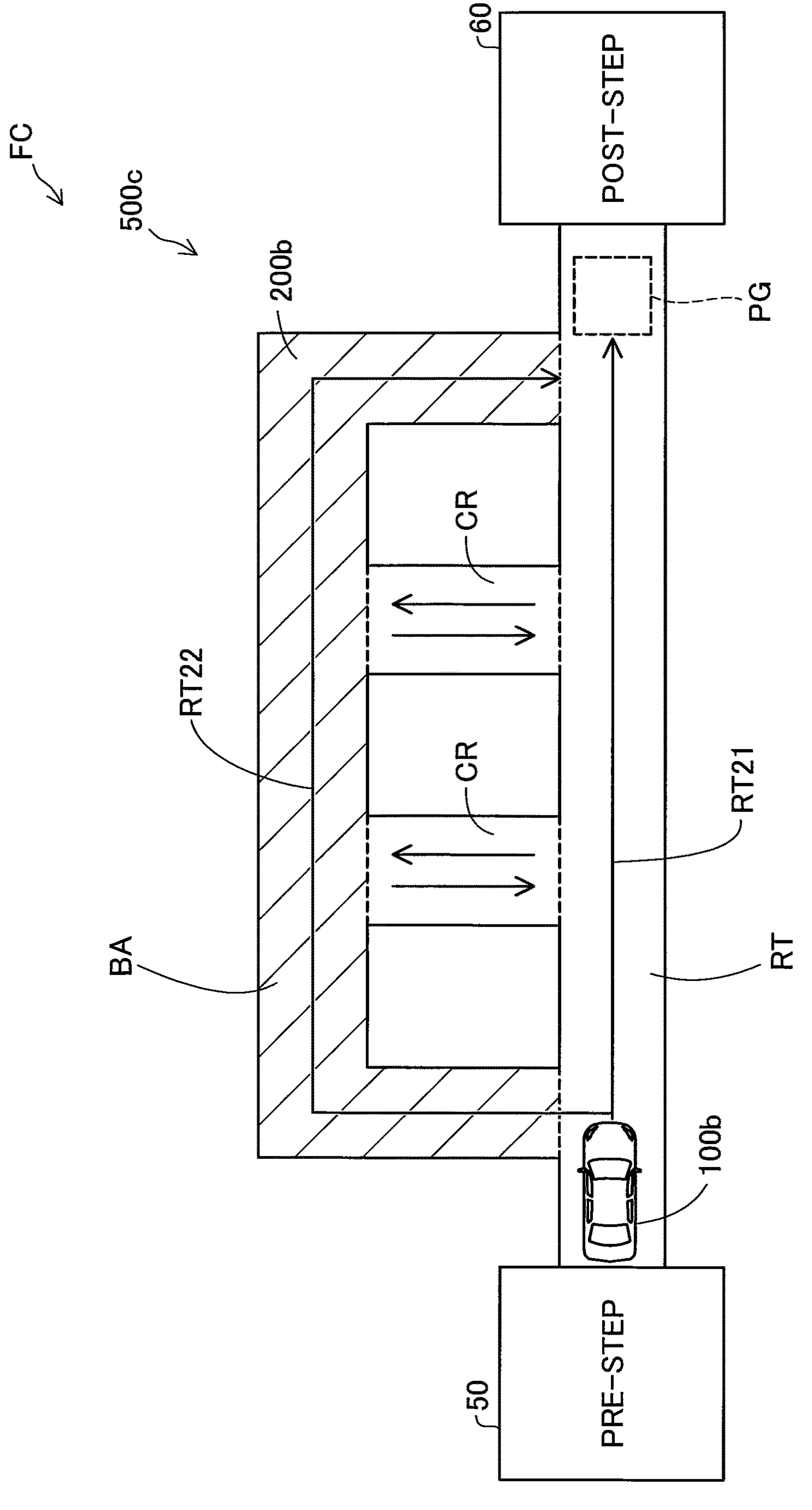
FIG. 7 is an explanatory view showing a schematic configuration of a system according to a third embodiment.

FIG. 7 is an explanatory view showing a schematic configuration of a system 500*c* according to a third embodiment. In the example shown in the above-described second embodiment, the feeding resonant circuits 252 of the power feeder 200*b* are arranged over the entire track RT from the pre-step 50 to the post-step 60 and the feeding processing is performed without moving the vehicle 100*b*. By contrast, in the feeding processing, the vehicle 100*b* may be brought to a state in which the vehicle 100*b* is fed automatically from the power feeder 200*b* by moving the vehicle 100*b* by remote control to a location where the feeding resonant circuit 252 is provided.

As shown in FIG. 7, the present embodiment differs from the system 500*b* of the second embodiment in that a factory FC is provided with a track RT for a vehicle 100*b* connecting a pre-step 50 and a post-step 60 to each other, and a track BA for feeding including a power feeder 200*b* as a non-contact power feeder. The configurations of the vehicle 100*b* and the power feeder 200*b* are the same as those of the second embodiment. The track BA for feeding is a bypass connected to the track RT and includes the power feeder 200*b* as the non-contact power feeder. If the feeding processing is not to be performed, the vehicle 100*b* runs by remote control along a route RT21 on the track RT toward a loading location PG for loading into the post-step 60. In the feeding processing, the vehicle 100*b* runs by remote control along a feeding route RT22 on the track BA for feeding.

Figure 8:
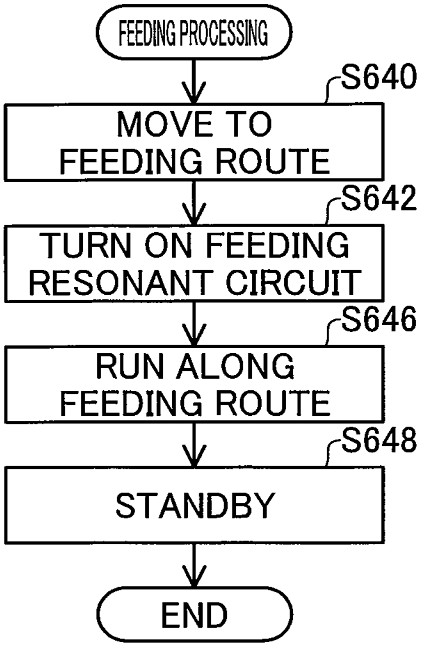
FIG. 8 is a flowchart showing a feeding processing according to the third embodiment.

FIG. 8 is a flowchart showing the feeding processing according to the third embodiment. At the time of start of this flow, all the feeding resonant circuits 252 are turned off and in a non-resonant state. In step S640, if the remote controller 312 accepts judgment result from the feeding judgment unit 314 that feeding is to be implemented, the remote controller 312 causes the vehicle 100*b* to run along the feeding route RT22 by remote control. In step S642, the feeding controller 212 turns on the feeding resonant circuit 252 provided at the track BA for feeding. The number of the feeding resonant circuits 252 to be turned on may be adjusted based on the value of power to be fed or a target value for an SOC, for example.

In step S646, the vehicle 100*b* runs on the track BA for feeding, thereby feeding the battery 120 from the power feeder 200*b* in a non-contact manner. If the feeding processing is performed during running of the vehicle 100*b* like in the present embodiment, the location of the vehicle 100*b* in a vehicle width direction may be adjusted at a location where power transfer efficiency becomes maximum using the magnetic field detector 259 and the misalignment detector 170. If an SOC is not to reach a target value before the running on the track BA for feeding is completed, the vehicle 100*b* may be stopped on the track BA for feeding and fed further. In step S648, the remote controller 312 places the vehicle 100*b* on standby at the loading location PG and then finishes the processing.

As shown in FIG. 7, the track BA for feeding and the track RT may be connected to each other via an auxiliary track CR. Providing the auxiliary track CR makes it possible to adjust a period when the vehicle 100*b* runs on the track BA for feeding, timing of switching of running from the track RT to the track BA for feeding, etc. when the vehicle 100*b* is on the move from the pre-step 50 to the post-step 60.

D. Fourth Embodiment

Figure 9:
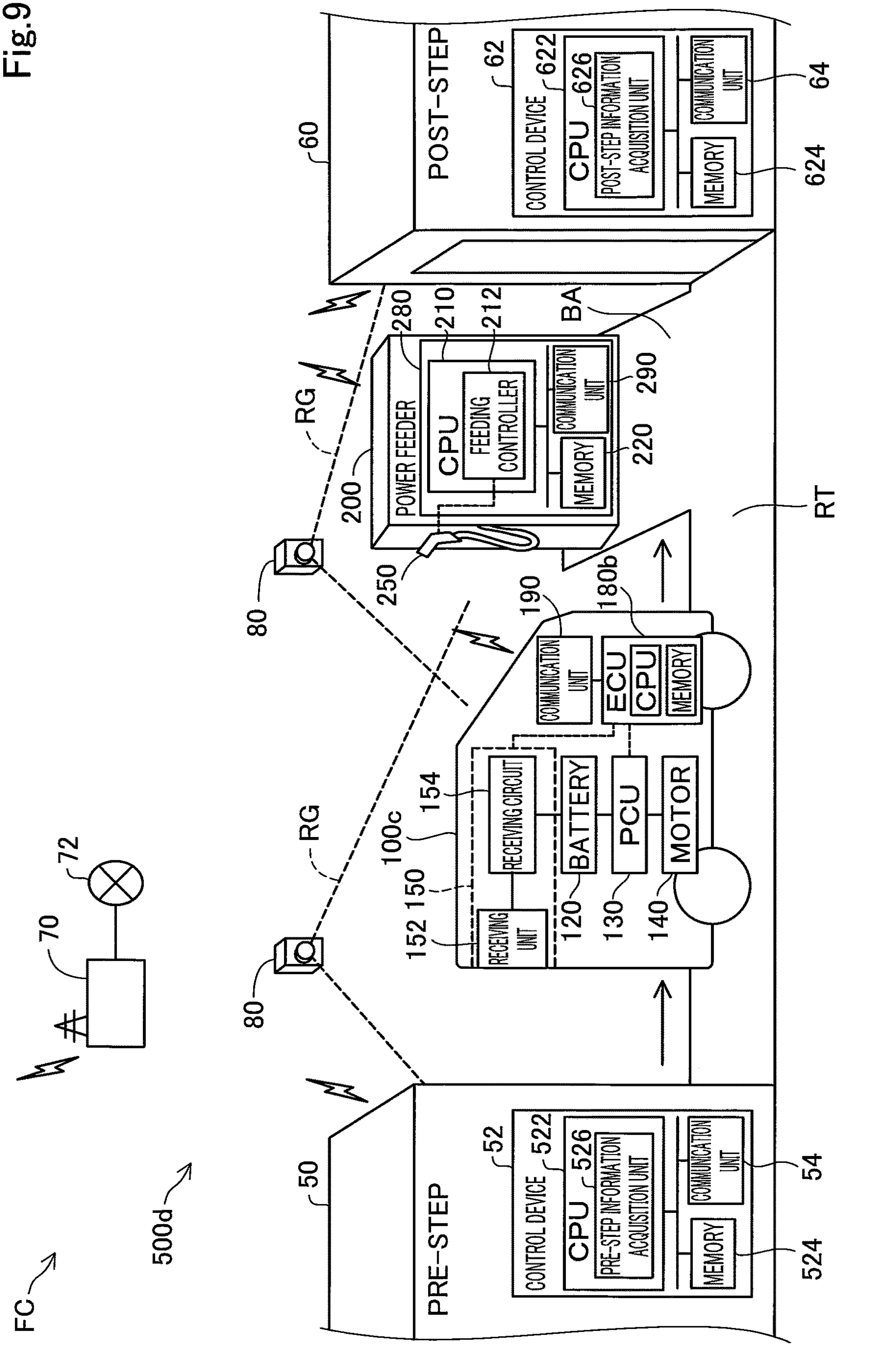
FIG. 9 is an explanatory view showing a schematic configuration of a system according to a fourth embodiment.

FIG. 9 is an explanatory view showing a schematic configuration of a system 500*d* according to a fourth embodiment. The present embodiment differs from the first embodiment in that the system 500*d* does not include the server 300. Unless specifically stated, the configuration of the system 500*d* is otherwise the same as that of the first embodiment.

Figure 10:
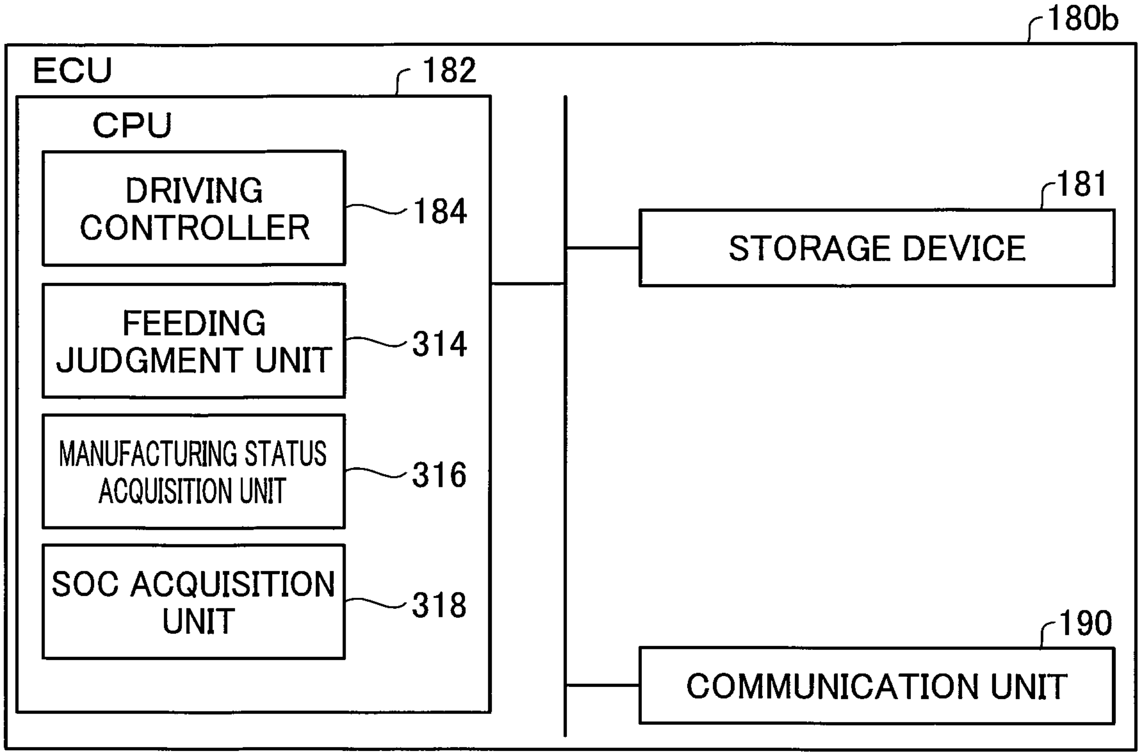
FIG. 10 is a block diagram showing a functional configuration of an ECU of a vehicle according to the fourth embodiment.

FIG. 10 is a block diagram showing a functional configuration of an ECU 180*b* of a vehicle 100*c* according to the fourth embodiment. As shown in FIG. 10, the ECU 180*b* includes a CPU 182 as a central processing unit, a storage device 181 such as a ROM or a RAM, for example, and a communication unit 190 connected to an interface circuit not shown in the drawings. These units are connected to each other via an internal bus in a manner allowing bidirectional communication therebetween. The CPU 182 executes various programs stored in the storage device 181 to realize various functions including functions as a driving controller 184, the feeding judgment unit 314, the manufacturing status acquisition unit 316, and the SOC acquisition unit 318. As will be described later, the driving controller 184 of the present embodiment allows the vehicle 100*c* to run by autonomous control by the vehicle 100*c*.

Figure 11:
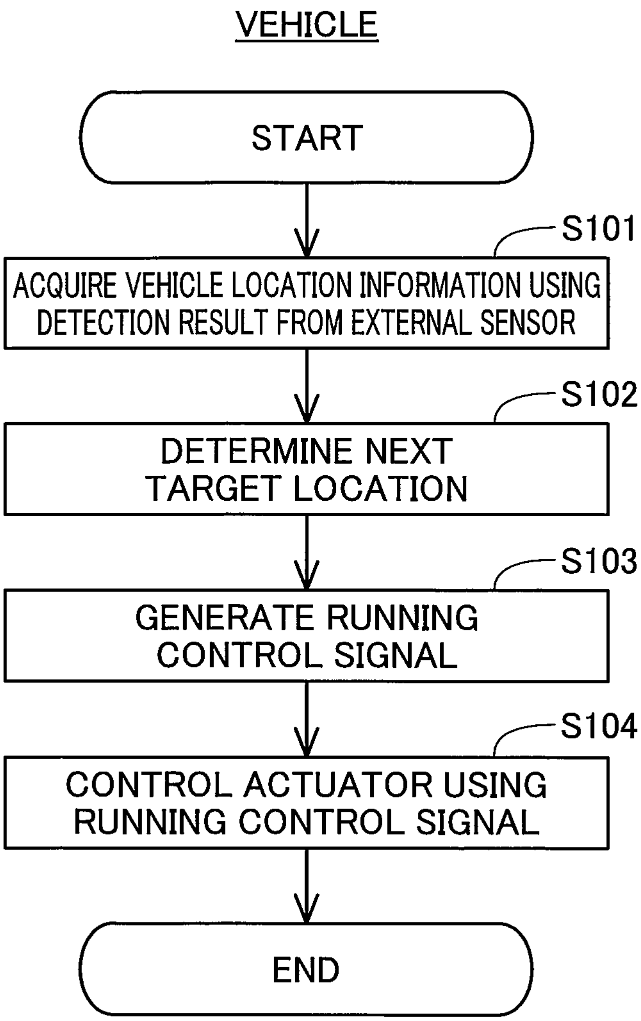
FIG. 11 is a flowchart showing a running method of causing the vehicle to run according to the fourth embodiment.

FIG. 11 is a flowchart showing a running method of causing the vehicle 100*c* to run according to the fourth embodiment. In step S101, the driving controller 184 acquires vehicle location information using detection result output from the camera 80 as an external sensor. In step S102, the driving controller 184 determines a target location to which the vehicle 100*c* is to move next. In the present embodiment, the storage device 181 of the ECU 180*b* contains a reference route stored in advance. In step S103, the driving controller 184 generates a running control signal for causing the vehicle 100*c* to run to the determined target location. In step S104, the driving controller 184 controls an actuator using the generated running control signal, thereby causing the vehicle 100*c* to run by following a parameter indicated by the running control signal. The driving controller 184 repeats the acquisition of vehicle location information, the determination of a target location, the generation of a running control signal, and the control over the actuator in a predetermined cycle. According to the vehicle 100*c* of the present embodiment, it is possible to cause the vehicle 100*c* to run by autonomous control without controlling the vehicle 100*c* remotely using the server 300.

In the present embodiment, each process in the flowcharts in FIGS. 3 and 4 is performed by the ECU 180*b* of the vehicle 100*c*. More specifically, in step S10 in FIG. 3, the driving controller 184 causes the vehicle 100*c* to run toward the post-step 60 by autonomous control. Then, the feeding judgment unit 314 of the vehicle 100*c* starts a feeding judgment process of judging whether to feed the vehicle 100*c*. Step S20 is performed by the feeding judgment unit 314 of the vehicle 100*c* in the same way as that in the first embodiment. In step S30, the driving controller 184 stops the vehicle 100*c* temporarily and waits for loading of the vehicle 100*c*. Step S40 is performed by the SOC acquisition unit 318 of the vehicle 100*c* in the same way as that in the first embodiment. Step S50 is performed by the feeding judgment unit 314 of the vehicle 100*c* in the same way as that in the first embodiment. In step S70, the driving controller 184 waits for permission of loading from the post-step 60. In step S80, the driving controller 184 causes the vehicle 100*c* to run by autonomous control and loads the vehicle 100*c* into the post-step 60. The driving controller 184 moves the vehicle 100*c* to a location where the vehicle 100*c* is deliverable to the post-step 60, and then finishes the processing.

Step S602 in FIG. 4 is performed by the feeding judgment unit 314 of the vehicle 100*c* in the same way as that in the first embodiment. In step S604, the driving controller 184 causes the vehicle 100*c* to run by autonomous control to the location P2 where the vehicle 100*c* is manually feedable using the power feeder 200. In step S610, the driving controller 184 places the vehicle 100*c* on standby at a predetermined standby location, and then finishes the processing.

As described above, according to the system 500*d* of the present embodiment, if the vehicle 100*c* is not permitted to be loaded into the post-step 60 during automatic driving of the vehicle 100*c* by autonomous control from the pre-step 50 to the post-step 60, it is possible to feed the vehicle 100*c* using a standby period. Thus, the present embodiment also suppresses or prevents excessive reduction in an SOC of the battery 120 during a course of manufacture of the vehicle 100*c*, making it possible to reduce or eliminate a likelihood of trouble such as quality reduction of the battery 120 or impossibility for the vehicle 100*c* to run occurring before loading into the post-step 60. Furthermore, according to the present embodiment, the manufacturing status acquisition unit 316 of the vehicle 100*c* acquires information about a manufacturing status, and the feeding judgment unit 314 of the vehicle 100*c* judges whether to feed the vehicle 100*c* using the acquired information about the manufacturing status. This allows the vehicle 100*c* to judge by itself as to whether to feed the vehicle 100*c*.

E. Fifth Embodiment

Figure 12:
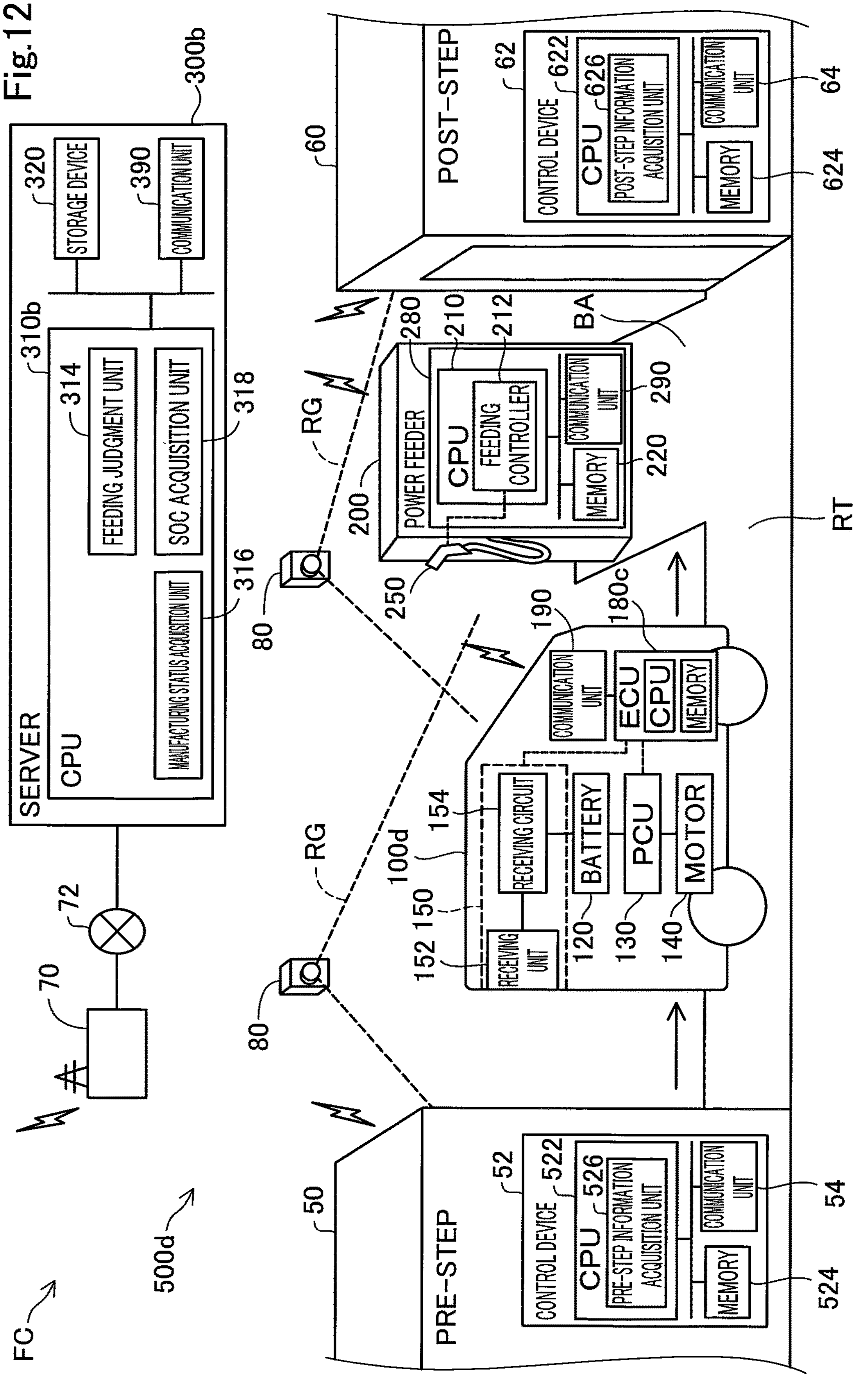
FIG. 12 is an explanatory view showing a schematic configuration of a system according to a fifth embodiment.
Figure 13:
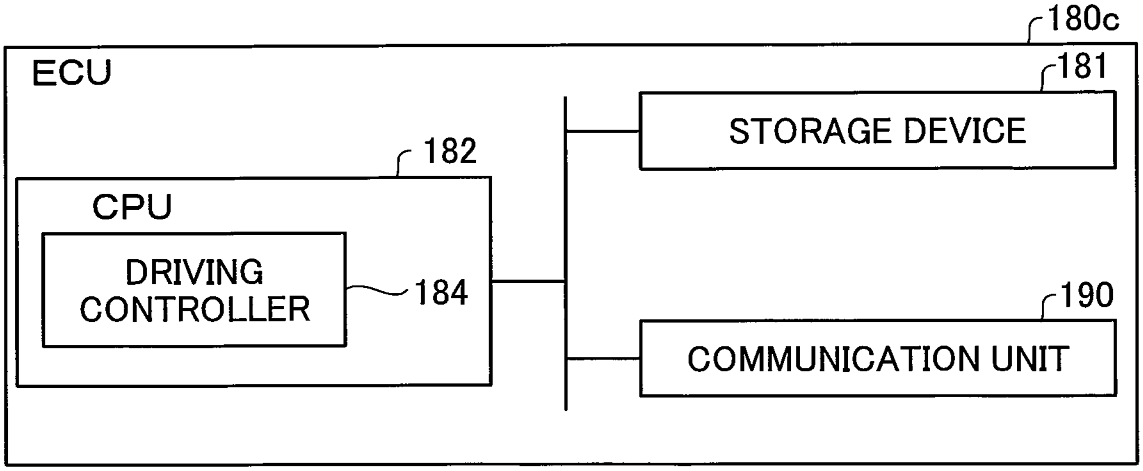
FIG. 13 is a block diagram showing a functional configuration of an ECU of a vehicle according to the fifth embodiment.

FIG. 12 is an explanatory view showing a schematic configuration of a system 500*e* according to a fifth embodiment. FIG. 13 is a block diagram showing a functional configuration of an ECU 180*c* of a vehicle 100*d* according to the fifth embodiment. In the present embodiment, a CPU 310*b* of a server 300*b* does not function as the remote controller 312, unlike in the first embodiment. Furthermore, in the present embodiment, the ECU 180*c* does not function as the feeding judgment unit 314, the manufacturing status acquisition unit 316, or the SOC acquisition unit 318, unlike in the fourth embodiment. More specifically, in the present embodiment, the CPU 310*b* of the server 300*b* functions as the feeding judgment unit 314, the manufacturing status acquisition unit 316, and the SOC acquisition unit 318, like in the first embodiment. Furthermore, the ECU 180*c* functions as the driving controller 184, like in the fourth embodiment. Unless specifically stated, the configuration of the system 500*e* is otherwise the same as that of the first embodiment.

In the present embodiment, the vehicle 100*d* runs by autonomous control by the vehicle 100*d* in response to implementation of the running method shown in FIG. 11, like in the fourth embodiment. Furthermore, in the present embodiment, steps S10, S30, S70, and S80 in FIG. 3 are performed by the driving controller 184 of the vehicle 100*d*, like in the fourth embodiment. Meanwhile, steps S20, S40, and S50 in FIG. 3 are performed by the CPU 310*b* of the server 300*b*, like in the first embodiment. Furthermore, steps S604 and S610 in FIG. 4 are performed by the driving controller 184 of the vehicle 100*d*, like in the fourth embodiment. Meanwhile, step S602 in FIG. 4 is performed by the CPU 310*b* of the server 300*b*, like in the first embodiment. In step S50 of the present embodiment, if the CPU 310*b* of the server 300*b* judges to implement feeding, the CPU 310*b* may transmit feeding information to the vehicle 100*d* indicating that the vehicle 100*d* is to be fed. In step S604 of the present embodiment, the driving controller 184 of the vehicle 100*d* may acquire the feeding information transmitted from the server 300*b*, and may cause the vehicle 100*d* to run to the location P2 on the track BA for feeding using the feeding information as a trigger, for example.

As described above, according to the system 500*e* of the present embodiment, if the vehicle 100*d* is not permitted to be loaded into the post-step 60 during automatic driving of the vehicle 100*d* by autonomous control from the pre-step 50 to the post-step 60, it is also possible to feed the vehicle 100*d* using a standby period, like in the fourth embodiment. Thus, the present embodiment also suppresses or prevents excessive reduction in an SOC of the battery 120 during a course of manufacture of the vehicle 100*d*, making it possible to reduce or eliminate a likelihood of trouble such as quality reduction of the battery 120 or impossibility for the vehicle 100*d* to run occurring before loading into the post-step 60.

Each configuration in the second embodiment or the third embodiment is applicable to an embodiment such as the fourth embodiment or the fifth embodiment in which the vehicle 100*c*, 100*d* runs by autonomous control.

F. Other Embodiments (F1) In each of the above-described embodiments, functions including those of the feeding judgment unit 314, the manufacturing status acquisition unit 316, and the SOC acquisition unit 318 may be provided at the vehicle 100. In this case, as described in the fourth embodiment, all the functions as the feeding judgment unit 314, the manufacturing status acquisition unit 316, and the SOC acquisition unit 318 may be provided at the vehicle 100, or some of these functions may be provided at the vehicle 100.

(F2) In the example shown in the above-described second embodiment, the misalignment detector 170 transfers power to the magnetic field detector 259 provided at the power feeder 200*b*. By contrast, the misalignment detector 170 may be a unit that detects the location of the vehicle 100*b* relative to the power feeder 200*b*. For example, the misalignment detector 170 may be a camera that acquires an image of an alignment mark arranged at a location where power transfer efficiency becomes maximum. The misalignment detector 170 may acquire an image of the alignment mark on the track RT. Then, the location of the vehicle 100*b* may be aligned with the acquired location of the alignment mark, thereby achieving maximum power transfer efficiency. The misalignment detector 170 may detect not only a magnetic field but also an ultrasonic wave, for example.

(F3) In the example shown in the above-described second embodiment, the alternating magnetic field generating circuit is provided at the vehicle 100*b* and the magnetic field detector 259 is provided at the power feeder 200*b*. By contrast, the power feeder 200*b* may include an alternating magnetic field generating circuit and the vehicle 100*b* may include a magnetic field detector. In this case, it is possible to detect misalignment between the receiving resonant circuit 152*b* and the feeding resonant circuit 252 using the ECU 180 of the vehicle 100*b* based on output from the magnetic field detector provided at the vehicle 100*b*.

(F4) In the example shown in the above-described first embodiment, the feeding judgment unit 314 judges whether to feed the vehicle 100 using an SOC of the battery 120 further together with information about a manufacturing status in the post-step 60. By contrast, the feeding judgment unit 314 may judge whether to feed the vehicle 100 using only information about a manufacturing status in the post-step 60. In this case, it is possible to simplify the processing by omitting the SOC acquisition unit 318. Furthermore, instead of or together with a delay status in the post-step 60, the feeding judgment unit 314 may use scheduled time of loading into the post-step 60 or a standby period of the vehicle 100 as a manufacturing status in the post-step 60 in judging whether to implement feeding. If a period to the scheduled loading time or the standby period is long enough for implementing feeding, for example, the feeding processing may be performed. This configuration achieves efficient feeding using a period to the loading into the post-step 60. If the period to the scheduled loading time is short, the vehicle 100 may be loaded into the post-step 60 before being fed to an SOC at a target value. In this case, step S40 shown in FIG. 3 is omissible or may be shortened, making it possible to improve the productivity of the vehicle 100.

(F5) In the example shown in the above-described first embodiment, the manufacturing status acquisition unit 316 acquires a delay status with respect to a target manufacturing period in the post-step 60 as information about a manufacturing status. If delay from the target manufacturing period has occurred and if an SOC is lower than a target value defined in advance, the feeding judgment unit 314 judges that the vehicle 100 is to be fed. By contrast, the manufacturing status acquisition unit 316 may acquire information other than the delay status with respect to the target manufacturing period in the post-step 60 as the information about the manufacturing status. The manufacturing status acquisition unit 316 may acquire a judgment as to whether the process in the pre-step 50 has been finished in a period shorter than a target manufacturing period, for example, as the information about the manufacturing status. If the process in the pre-step 50 has been finished in a period shorter than the target manufacturing period, a resultant period may be used to perform the feeding processing efficiently.

(F6) In the example shown in the above-described second embodiment, the vehicle 100*b* is moved to a location where the efficiency of power transfer from the feeding resonant circuit 252 to the receiving resonant circuit 152*b* becomes maximum. By contrast, if an SOC of the battery 120 is sufficient and if a sufficient period is obtainable for the feeding processing as a result of a long period to scheduled loading time of loading into the post-step 60, for example, it is not required to move the vehicle 100*b* to a location where power transfer efficiency becomes maximum. In this case, it is possible to simplify the configuration of the system 500*b* by omitting the configurations of the misalignment detector 170 and the magnetic field detector 259.

(F7) In the example shown in the above-described first embodiment, if the feeding judgment unit 314 judges that the vehicle 100 is to be fed, the vehicle 100 moves to the location P2 where the vehicle 100 is manually feedable from the power feeder 200, thereby allowing the vehicle 100 to be fed manually by an operator. By contrast, the vehicle 100 may become manually feedable by an operator without being moved. For example, if the feeding judgment unit 314 judges that the vehicle 100 is to be fed, the feeding judgment unit 314 makes a notification to an operator, for example, for prompting the operator to feed the vehicle 100 using the power feeder 200. In response to receipt of the notification, the operator moves to the vehicle 100 while carrying the portable and mobile power feeder 200 or the feeding connector 250 of the power feeder 200 and feeds the vehicle 100 manually. This configuration achieves suppression or prevention of excessive reduction in an SOC of the battery 120 without moving the vehicle 100, making it possible to reduce or eliminate a likelihood of trouble such as quality reduction of the battery 120 or impossibility for the vehicle 100 to run occurring before loading into the post-step 60.

(F8) In each of the above-described embodiments, the external sensor used for unmanned driving of the vehicle 100 is the camera 80. By contrast, the external sensor is not limited to the camera 80 but may be a distance measuring device, for example. The distance measuring device is a light detection and ranging (LiDAR), for example. In this case, detection result output from the external sensor may be three-dimensional point cloud data. The server 300, 300*b* or the ECU 180-180*c* may calculate the location and orientation of a moving object through template matching using the three-dimensional point cloud data as the detection result and reference point cloud data, for example. For example, an interactive closest point (ICP) or normal distributions transform (NDT) algorithm is used as an algorithm for the template matching. The reference point cloud data may be generated based on three-dimensional CAD data indicating the outer shape of the vehicle 100, for example.

(F9) In each of the above-described embodiments, the vehicle 100 is simply required to have a configuration to become movable by unmanned driving. The vehicle 100 may embodied as a platform having the following configuration, for example. The vehicle 100 is simply required to include at least actuators and a controller. More specifically, in order to fulfill three functions including "run," "turn," and "stop" by unmanned driving, the actuators may include a driving device, a steering device and a braking device. The actuators are controlled by the controller that controls running of the vehicle 100. In order for the vehicle 100 to acquire information from outside for unmanned driving, the vehicle 100 is simply required to include the communication unit 190 further. Specifically, the vehicle 100 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 100 before the vehicle 100 is shipped from a factory, or a remaining component such as a bodyshell may be mounted on the vehicle 100 after the vehicle 100 is shipped from a factory while the remaining component such as a bodyshell is not mounted on the vehicle 100. Each of components may be mounted on the vehicle 100 from any direction such as from above, from below, from the front, from the back, from the right, or from the left. Alternatively, these components may be mounted from the same direction or from respective different directions. The location determination for the platform may be performed in the same way as for the vehicle 100 in the first embodiments.

(F10) In each of the above-described embodiments, the vehicle 100 may be manufactured by an arbitrary manufacturing method. For example, the vehicle 100 may be manufactured by combining a plurality of modules. The module means a unit composed of one or more components grouped according to a configuration or function of the vehicle 100. For example, a platform of the vehicle 100 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 100 different from the platform may be modularized. Various modules may include an arbitrary exterior component such as a bumper or a grill, or an arbitrary interior component such as a seat or a console. Not only the vehicle 100 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

(F11) In the example shown in the above-described first to third embodiments, the server 300 performs the processing from acquisition of vehicle location information about the vehicle 100, 100*b* to generation of a running control signal. By contrast, the vehicle 100, 100*b* may perform at least part of the processing from acquisition of vehicle location information about the vehicle 100, 100*b* to generation of a running control signal. For example, embodiments (1) to (3) described below are applicable, for example.

(1) The server 300 may acquire vehicle location information about the vehicle 100, 100*b*, determine a target location to which the vehicle 100, 100*b* is to move next, and generate a route from a current location of the vehicle 100, 100*b* indicated by the acquired vehicle location information to the target location. The server 300 may generate a route to the target location between the current location and a destination, or generate a route to the destination. The server 300 may transmit the generated route to the vehicle 100, 100*b*. The vehicle 100, 100*b* may generate a running control signal in such a manner as to cause the vehicle 100, 100*b* to run along the route received from the server 300, and control an actuator using the generated running control signal.

(2) The server 300 may acquire vehicle location information about the vehicle 100, 100*b*, and transmit the acquired vehicle location information to the vehicle 100, 100*b*. The vehicle 100, 100*b* may determine a target location to which the vehicle 100, 100*b* is to move next, generate a route from a current location of the vehicle 100, 100*b* indicated by the received vehicle location information to the target location, generate a running control signal in such a manner as to cause the vehicle 100, 100*b* to run along the generated route, and control an actuator using the generated running control signal.

(3) In the foregoing embodiments (1) and (2), an internal sensor may be mounted on the vehicle 100, 100*b*, and detection result output from the internal sensor may be used in at least one of the generation of the route and the generation of the running control signal. The internal sensor is a sensor mounted on the vehicle 100. The internal sensor might include a sensor that detects a motion state of the vehicle 100, a sensor that detects an operating state of each part of the vehicle 100, and a sensor that detects an environment around the vehicle 100, for example. More specifically, the internal sensor might include a camera, LiDAR, a millimeter wave radar, an ultrasonic wave sensor, a GPS sensor, an acceleration sensor, and a gyroscopic sensor, for example. For example, in the foregoing embodiment (1), the server 300 may acquire detection result from the internal sensor, and in generating the route, may reflect the detection result from the internal sensor in the route. In the foregoing embodiment (1), the vehicle 100, 100*b* may acquire detection result from the internal sensor, and in generating the running control signal, may reflect the detection result from the internal sensor in the running control signal. In the foregoing embodiment (2), the vehicle 100, 100*b* may acquire detection result from the internal sensor, and in generating the route, may reflect the detection result from the internal sensor in the route. In the foregoing embodiment (2), the vehicle 100 may acquire detection result from the internal sensor, and in generating the running control signal, may reflect the detection result from the internal sensor in the running control signal.

(F12) In the above-described fourth and fifth embodiments, the vehicle 100*c*, 100*d* may be equipped with an internal sensor, and detection result output from the internal sensor may be used in at least one of generation of a route and generation of a running control signal. For example, the vehicle 100*c*, 100*d* may acquire detection result from the internal sensor, and in generating the route, may reflect the detection result from the internal sensor in the route. The vehicle 100*c*, 100*d* may acquire detection result from the internal sensor, and in generating the running control signal, may reflect the detection result from the internal sensor in the running control signal.

(F13) In the above-described fourth and fifth embodiments, the vehicle 100*c*, 100*d* acquires vehicle location information about the vehicle 100 using detection result from the camera 80 as an external sensor. By contrast, the vehicle 100*c*, 100*d* may be equipped with an internal sensor, the vehicle 100*c*, 100*d* may acquire vehicle location information using detection result from the internal sensor, determine a target location to which the vehicle 100*c*, 100*d* is to move next, generate a route from a current location of the vehicle 100*c*, 100*d* indicated by the acquired vehicle location information to the target location, generate a running control signal for running along the generated route, and control an actuator using the generated running control signal. In this case, the vehicle 100*c*, 100*d* is capable of running without using any detection result from an external sensor. The vehicle 100*c*, 100*d* may acquire target arrival time or traffic congestion information from outside the vehicle 100*c*, 100*d*, and reflect the target arrival time or traffic congestion information in at least one of the route and the running control signal. The configuration of the system 500 or the functional configuration of the server 300 may be entirely provided at the vehicle 100. Specifically, the processes realized by the system 500 or the server 300 shown in the present disclosure may be realized by the vehicle 100 alone.

(F14) In the above-described first to third embodiments, the server 300 automatically generates a running control signal to be transmitted to the vehicle 100, 100*b*. By contrast, the server 300 may generate a running control signal to be transmitted to the vehicle 100, 100*b* in response to operation by an external operator existing outside the vehicle 100, 100*b*. For example, the external operator may operate an operating device including a display on which a captured image output from the camera 80 is displayed, steering, an accelerator pedal, and a brake pedal for operating the vehicle 100, 100*b* remotely, and a communication device for making communication with the server 300 through wire communication or wireless communication, for example, and the server 300 may generate a running control signal responsive to the operation on the operating device.

In the foregoing embodiment in which the running control signal is generated in response to the operation by the external operator, if the feeding judgment unit 314 judges that feeding is to be implemented using information about a manufacturing status, manual operation information may be displayed on the display of the operating device. The manual operation information is information for bringing the vehicle 100 to a feedable state in response to the operation by the external operator. The manual operation information may include either one or both of a message instructing to change a destination of the vehicle 100 in order to bring the vehicle 100 to a feedable state, and a destination as changed, for example. The changed destination is the location P2 described above, for example. The changed destination may be shown on the display by being expressed by a character, in a map, in a captured image, or by being superimposed on a captured image, for example. In addition to or instead of being shown on the display in this way, the manual operation information may be output as voice information to the operator from a speaker provided at the operating device. This allows the external operator to operate the operating device according to the manual operation information in such a manner as to bring the vehicle 100 to a feedable state, thereby allowing the vehicle 100 to be fed using the power feeder 200.

In the embodiment in which a running control signal is generated in response to operation by the external operator, if the feeding judgment unit 314 judges that feeding is to be implemented, the remote controller 312 may stop generation of a running control signal in response to operation by the external operator, change a destination of the vehicle 100 for bringing the vehicle 100 to a feedable state, and generate a running control signal automatically, thereby causing the vehicle 100 to run toward the destination as changed. Of the cases described above, the change of the destination or the generation of the running control signal may be realized by the vehicle 100, for example. Specifically, in the foregoing cases, running of the vehicle 100 to the changed destination may be realized by remote control or autonomous control. By doing so, it becomes possible to bring the vehicle 100 to a feedable state and feed the vehicle 100 using the power feeder 200 like in the manner described in the first to fifth embodiments.

(F15) A configuration for realizing running of a vehicle by unmanned driving is also called a "Remote Control auto Driving system". Conveying a vehicle using Remote Control Auto Driving system is also called "self-running conveyance". Producing the vehicle using self-running conveyance is also called "self-running production". In self-running production, for example, at least part of the conveyance of vehicles is realized by self-running conveyance in a factory where the vehicle is manufactured.

In each of the above-described embodiments, examples of the vehicle 100 include a passenger car, a truck, a bus, and a vehicle for construction work. Meanwhile, the vehicle 100 may be various moving objects. The "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a two-wheel vehicle, a four-wheel vehicle, or a combat vehicle, for example. The vehicle includes a battery electric vehicle (BEV), a gasoline automobile, a hybrid automobile, and a fuel cell automobile. If the moving object is other than a vehicle, the term "vehicle" or "car" in the present disclosure is replaceable with a "moving object" as appropriate, and the term "run" is replaceable with "move" as appropriate.

The control and the method described in the present disclosure may be realized by a dedicated computer provided by configuring a processor and a memory programmed in such a manner as to implement one or a plurality of functions embodied by a computer program. Alternatively, the controller and the method described in the present disclosure may be realized by a dedicated computer provided by configuring a processor using one or more dedicated hardware logic circuits. Still alternatively, the controller and the method described in the present disclosure may be realized by one or more dedicated computers configured using a combination of a processor and a memory programmed in such a manner as to implement one or a plurality of functions, and a processor configured using one or more hardware logic circuits. The computer program may be stored as an instruction to be executed by a computer into a computer-readable tangible non-transitory recording medium.

The present disclosure is not limited to the embodiments described above and is able to be implemented with various configurations without departing from the spirit thereof. For example, the technical features of any of the embodiment, the examples and the modifications may be replaced or combined appropriately, in order to solve part or all of the problems described above or in order to achieve part or all of the advantageous effects described above. When the technical features are not described as essential features in the present specification, they are able to be deleted as necessary. The present disclosure may be implemented by aspects described below.

(1) According to a first aspect of the present disclosure, a system used in a factory for manufacture of a vehicle is provided. The system comprises: a remote controller remotely controlling running of the vehicle capable of running in the factory during a course of manufacture in the factory, the vehicle including a communication device having a communication function for remote control and a secondary battery for running; a power feeder available for charging the secondary battery; a manufacturing status acquisition unit acquiring information about a manufacturing status in the factory; and a feeding judgment unit judging whether to feed the vehicle using the acquired information about the manufacturing status. When the feeding judgment unit judges that the vehicle is to be fed, the vehicle is fed using the power feeder.

According to the system of this aspect, it is possible to feed the vehicle using a standby period generated in response to a manufacturing status such as failing to load the vehicle into a post-step during driving of the vehicle by remote control. This suppresses or prevents excessive reduction in a state of charge of the secondary battery during the course of manufacture, making it possible to reduce or eliminate a likelihood of trouble such as quality reduction of the secondary battery of the vehicle or impossibility for the vehicle to run.

(2) The system of the above-described aspect may further comprise a state of charge acquisition unit acquiring a state of charge of the secondary battery. The feeding judgment unit may judge whether to feed the vehicle using the acquired state of charge of the secondary battery further.

According to the system of this aspect, by monitoring the state of charge of the secondary battery, it is possible to implement feeding appropriate for the state of charge. This suppresses or prevents overcharging of the secondary battery.

(3) In the system of the above-described aspect, the manufacturing status acquisition unit may acquire a delay status with respect to a target manufacturing period in a post-step that is a destination of running of the vehicle as the information about the manufacturing status. When delay from the target manufacturing period has occurred and if the state of charge is lower than a target value defined in advance, the feeding judgment unit may judge that the vehicle is to be fed.

According to the system of this aspect, it is possible to adjust the state of charge at an intended value using a standby period generated as a result of delay in manufacture in the post-step.

(4) In the system of the above-described aspect, the power feeder may be a non-contact power feeder provided in the factory. When the feeding judgment unit judges that the vehicle is to be fed, feeding using the non-contact power feeder may be started.

According to the system of this aspect, it is possible to feed the vehicle during running or stopping in the factory by remote control, allowing the state of the charge of the secondary battery to be adjusted efficiently.

(5) In the system of the above-described aspect, the remote controller may move the vehicle to a location where power transfer efficiency of power received from the non-contact power feeder becomes maximum.

The system of this aspect further improves efficiency in feeding the vehicle during running.

(6) According to a second aspect of the present disclosure, a system used in a factory for manufacture of a vehicle is provided. The system comprises: a remote controller remotely controlling running of the vehicle capable of running in the factory during a course of manufacture in the factory, the vehicle including a communication device having a communication function for remote control and a secondary battery for running; a manufacturing status acquisition unit acquiring information about a manufacturing status in the factory; and a feeding judgment unit judging whether to feed the vehicle using the acquired information about the manufacturing status. When the feeding judgment unit judges that the vehicle is to be fed, at least one of making a notification and moving the vehicle is implemented. The making the notification is implemented by the feeding judgment unit for prompting feeding of the vehicle using a power feeder. The moving the vehicle is implemented by the remote controller and is to move to a location where the vehicle is feedable using the power feeder.

According to the system of this aspect, it is possible to feed the vehicle using a standby period generated in response to a manufacturing status such as failing to load the vehicle into a post-step during driving of the vehicle by remote control. This feeding suppresses or prevents excessive reduction in a state of charge of the secondary battery during the course of manufacture, making it possible to reduce or eliminate a likelihood of trouble such as quality reduction of the secondary battery of the vehicle or impossibility for the vehicle to run.

(7) The system of the above-described aspect may further comprise a state of charge acquisition unit acquiring a state of charge of the secondary battery. The feeding judgment unit may judge whether to feed the vehicle using the acquired state of charge of the secondary battery further.

According to the system of this aspect, by monitoring the state of charge of the secondary battery, it is possible to implement feeding appropriate for the state of charge. This suppresses or prevents overcharging of the secondary battery, etc.

(8) In the system of the above-described aspect, the manufacturing status acquisition unit may acquire a delay status with respect to a target manufacturing period in a post-step that is a destination of running of the vehicle as the information about the manufacturing status. When delay from the target manufacturing period has occurred and if the state of charge is lower than a target value defined in advance, the feeding judgment unit may judge that the vehicle is to be fed.

According to the system of this aspect, it is possible to adjust the state of charge at an intended value using a standby period generated as a result of delay in manufacture in the post-step.

(9) According to a third aspect of the present disclosure, a method of manufacturing a vehicle is provided. The method of manufacturing a vehicle comprises: a step of causing the vehicle to run in a factory by remote control during a course of manufacture in the factory; a step of judging whether to feed the vehicle using information about a manufacturing status in the factory; and a step of bringing the vehicle to a state feedable using a power feeder when the vehicle is judged to be fed.

(10) According to a fourth aspect of the present disclosure, a server is provided. The server comprises: a remote controller remotely controlling running of a vehicle capable of running in a factory for manufacture of the vehicle during a course of manufacture in the factory, the vehicle including a communication device having a communication function for remote control and a secondary battery for running; a manufacturing status acquisition unit acquiring information about a manufacturing status in the factory; and a feeding judgment unit judging whether to feed the vehicle using the acquired information about the manufacturing status. When the feeding judgment unit judges that the vehicle is to be fed, the vehicle is fed using a power feeder available for charging the secondary battery.

(11) According to a fifth aspect of the present disclosure, a vehicle is provided. The vehicle is capable of running in a factory for manufacture of the vehicle during a course of manufacture in the factory, and comprises: a communication device having a communication function for remote control; a secondary battery for running; and a driving controller. When the vehicle is judged to be fed using information about a manufacturing status in the factory, the driving controller implements driving control over the vehicle using a control signal transmitted from a server to the vehicle in such a manner as to feed the secondary battery using a power feeder available for charging the secondary battery.

(12) According to a sixth aspect of the present disclosure, a vehicle is provided. The vehicle is capable of running in a factory for manufacture of the vehicle during a course of manufacture in the factory, and comprises: a secondary battery for running; and a driving controller. When the vehicle is judged to be fed using information about a manufacturing status in the factory, the driving controller implements driving control over the vehicle in such a manner as to feed the secondary battery using a power feeder available for charging the secondary battery.

(13) According to a seventh aspect of the present disclosure, a power feeder used in a factory for manufacture of a vehicle is provided. The power feeder is available for feeding a secondary battery for running provided at the vehicle capable of running in the factory during a course of manufacture in the factory, and comprises: a feeding controller that adjusts a feeding condition for feeding of the vehicle implemented when the vehicle is judged to be fed using information about a manufacturing status in the factory.

The present disclosure is feasible in various aspects other than the system, the method of manufacturing the vehicle, the server, the vehicle, and the power feeder. For example, the present disclosure may be realized in aspects including a method of feeding a vehicle, a method of controlling a power feeder, a method of remotely controlling a vehicle, a computer program, and a non-transitory recording medium storing the computer program.

What is claimed is:

1. A system used in a factory for manufacture of a vehicle, comprising:

a remote controller remotely controlling running of the vehicle capable of running in the factory during a course of the manufacture of the vehicle in the factory, the vehicle including a communication device having a communication function for remote control and a secondary battery for running;

a power feeder available for charging the secondary battery;

a manufacturing status acquisition unit acquiring information about a manufacturing status of the manufacture in the factory;

a feeding judgment unit judging whether to feed the vehicle using the acquired information about the manufacturing status; and a state of charge acquisition unit acquiring a state of charge of the secondary battery, wherein when the feeding judgment unit judges that the vehicle is to be fed, the vehicle is fed using the power feeder, the feeding judgment unit judges whether to feed the vehicle using the acquired state of charge of the secondary battery further, the manufacturing status acquisition unit acquires a delay status with respect to a target manufacturing period in a post-step that is a destination of running of the vehicle as the information about the manufacturing status, the target manufacturing period represents takt time for manufacturing the vehicle, the delay status includes at least one of presence or absence of the occurrence of delay from the target manufacturing period, an actually measured value of a period delayed from the target manufacturing period, and an expected delay period from the target manufacturing period, when delay from the target manufacturing period has occurred and the state of charge is lower than a target value defined in advance, the feeding judgment unit judges that the vehicle is to be fed, and when the delay from the target manufacturing period has not occurred and when the state of charge is not lower than the target value, the feeding judgment unit judges that the vehicle is not to be fed.

2. The system according to claim 1, wherein the power feeder is a non-contact power feeder provided in the factory, and when the feeding judgment unit judges that the vehicle is to be fed, feeding using the non-contact power feeder is started.

3. The system according to claim 2, further comprising:

a magnetic field sensor provided at the non-contact power feeder, the magnetic field sensor being configured to detect an alternating magnetic field generated from the vehicle, wherein the remote controller moves the vehicle to a location where the alternating magnetic field has a highest intensity.

4. A system used in a factory for manufacture of a vehicle, comprising:

a remote controller remotely controlling running of the vehicle capable of running in the factory during a course of the manufacture of the vehicle in the factory, the vehicle including a communication device having a communication function for remote control and a secondary battery for running;

a manufacturing status acquisition unit acquiring information about a manufacturing status of the manufacture in the factory;

a feeding judgment unit judging whether to feed the vehicle using the acquired information about the manufacturing status;

a state of charge acquisition unit acquiring a state of charge of the secondary battery, wherein the feeding judgment unit judges whether to feed the vehicle using the acquired state of charge of the secondary battery further, the manufacturing status acquisition unit acquires a delay status with respect to a target manufacturing period in a post-step that is a destination of running of the vehicle as the information about the manufacturing status, the target manufacturing period represents takt time for manufacturing the vehicle, the delay status includes at least one of presence or absence of the occurrence of delay from the target manufacturing period, an actually measured value of a period delayed from the target manufacturing period, and an expected delay period from the target manufacturing period, and when delay from the target manufacturing period has occurred and the state of charge is lower than a target value defined in advance, the feeding judgment unit judges that the vehicle is to be fed, when the delay from the target manufacturing period has not occurred and when the state of charge is not lower than the target value, the feeding judgment unit judges that the vehicle is not to be fed, when the feeding judgment unit judges that the vehicle is to be fed, at least one of making a notification and moving the vehicle is implemented, the making the notification is implemented by the feeding judgment unit for prompting feeding of the vehicle using a power feeder, and the moving the vehicle is implemented by the remote controller and is to move to a location where the vehicle is feedable using the power feeder.

5. The system according to claim 1, wherein the post-step is an inspection step on the vehicle after a pre-step that is an assembly step of installing a component on the vehicle.

6. The system according to claim 4, wherein the post-step is an inspection step on the vehicle after a pre-step that is an assembly step of installing a component on the vehicle.

7. A method of manufacturing a vehicle comprising:

a step of causing the vehicle to run in a factory by remote control during a course of manufacture of the vehicle in the factory;

a step of judging whether to feed the vehicle using information about a manufacturing status of the manufacture in the factory;

a step of bringing the vehicle to a state feedable using a power feeder when the vehicle is judged to be fed; and a step of acquiring a state of charge of a secondary battery provided at the vehicle, wherein the step of judging judges whether to feed the vehicle using the acquired state of charge of the secondary battery further, the manufacturing status includes a delay status with respect to a target manufacturing period in a post-step that is a destination of running of the vehicle, the target manufacturing period represents takt time for manufacturing the vehicle, the delay status includes at least one of presence or absence of the occurrence of delay from the target manufacturing period, an actually measured value of a period delayed from the target manufacturing period, and an expected delay period from the target manufacturing period, when delay from the target manufacturing period has occurred and the state of charge is lower than a target value defined in advance, the step of judging judges that the vehicle is to be fed, and when the delay from the target manufacturing period has not occurred and when the state of charge is not lower than the target value, the step of judging judges that the vehicle is not to be fed.

8. A server comprising:

a remote controller remotely controlling running of a vehicle capable of running in a factory for manufacture of the vehicle during a course of the manufacture in the factory, the vehicle including a communication device having a communication function for remote control and a secondary battery for running;

a manufacturing status acquisition unit acquiring information about a manufacturing status of the manufacture in the factory;

a feeding judgment unit judging whether to feed the vehicle using the acquired information about the manufacturing status; and a state of charge acquisition unit acquiring a state of charge of the secondary battery, wherein when the feeding judgment unit judges that the vehicle is to be fed, the vehicle is fed using a power feeder available for charging the secondary battery, the feeding judgment unit judges whether to feed the vehicle using the acquired state of charge of the secondary battery further, the manufacturing status acquisition unit acquires a delay status with respect to a target manufacturing period in a post-step that is a destination of running of the vehicle as the information about the manufacturing status, the target manufacturing period represents takt time for manufacturing the vehicle, the delay status includes at least one of presence or absence of the occurrence of delay from the target manufacturing period, an actually measured value of a period delayed from the target manufacturing period, and an expected delay period from the target manufacturing period, when delay from the target manufacturing period has occurred and the state of charge is lower than a target value defined in advance, the feeding judgment unit judges that the vehicle is to be fed, and when the delay from the target manufacturing period has not occurred and when the state of charge is not lower than the target value, the feeding judgment unit judges that the vehicle is not to be fed.

9. The method according to claim 7, wherein the post-step is an inspection step on the vehicle after a pre-step that is an assembly step of installing a component on the vehicle.

10. The server according to claim 8, wherein the post-step is an inspection step on the vehicle after a pre-step that is an assembly step of installing a component on the vehicle.

* * * * *